(12) United States Patent
Tüylüce et al.

(10) Patent No.: US 10,106,098 B2
(45) Date of Patent: Oct. 23, 2018

(54) LOAD CARRIER COMPRISING A LOCK ARRANGEMENT

(71) Applicant: Thule Sweden AB, Hillerstorp (SE)

(72) Inventors: Abdurrahman Tüylüce, Freising (DE); Günther Fritsche, Postbauer (DE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 15/740,638

(22) PCT Filed: Jul. 1, 2016

(86) PCT No.: PCT/EP2016/065480
§ 371 (c)(1),
(2) Date: Dec. 28, 2017

(87) PCT Pub. No.: WO2017/001651
PCT Pub. Date: Jan. 5, 2017

(65) Prior Publication Data
US 2018/0186299 A1   Jul. 5, 2018

(30) Foreign Application Priority Data

Jul. 2, 2015  (EP) .................................... 15174983

(51) Int. Cl.
*B60R 9/05* (2006.01)
*B60R 9/055* (2006.01)
(Continued)

(52) U.S. Cl.
CPC .......... *B60R 9/055* (2013.01); *E05B 65/5238* (2013.01); *E05C 9/026* (2013.01)

(58) Field of Classification Search
CPC ..... B60R 9/055; E05B 65/52; E05B 65/5207; E05B 65/5215; E05B 65/5223;
(Continued)

(56) References Cited

U.S. PATENT DOCUMENTS 4,249,684 A * 2/1981 Miller ....................... B60R 9/00
  109/51
5,823,411 A * 10/1998 Gronwoldt .............. B60R 9/055
  224/328

(Continued)

FOREIGN PATENT DOCUMENTS

BE    1017488 A3   10/2008
DE    8531889 U1    1/1986
(Continued)

OTHER PUBLICATIONS

European Search Report (ESR) for Application No. EP 15174983.5, dated Dec. 14, 2015, 6 pages.
(Continued)

*Primary Examiner* — Corey Skurdal
(74) *Attorney, Agent, or Firm* — Sterne, Kessler, Goldstein & Fox P.L.L.C.

(57) ABSTRACT

A load carrier and a method for operating the load carrier. The load carrier includes a base, a lid, and a lock arrangement arranged on the base and/or the lid, to lock the lid to the base. The lock arrangement includes at least a first and a second displaceable lock element operable between a locked position and an unlocked position. The first and the second lock elements are arranged to respectively engage with a first and a second lock member arranged on the opposing base or lid when being positioned in the locked position. The lock arrangement further includes an elongated actuation element in working cooperation with the first and the second lock element. An actuator arranged to displace the elongated actuation element from a locked position to a first position and thereby displacing the first and the second lock element from the locked position to the unlocked position.

17 Claims, 21 Drawing Sheets

(51) Int. Cl.
*E05C 9/02* (2006.01)
*E05B 65/52* (2006.01)

(58) Field of Classification Search
CPC ...... E05B 65/523; E05B 65/5284; E05C 9/02; E05C 9/025; E05C 9/026
See application file for complete search history.

(56) References Cited

U.S. PATENT DOCUMENTS

| | | | | |
|---|---|---|---|---|
| 7,352,566 | B2* | 4/2008 | Huang | E05B 73/0082 |
| | | | | 361/679.55 |
| 7,740,157 | B2* | 6/2010 | Fisher | B60R 9/055 |
| | | | | 16/232 |
| 2004/0256427 | A1* | 12/2004 | Settelmayer | B60R 9/055 |
| | | | | 224/319 |
| 2009/0090145 | A1* | 4/2009 | Engelberth | B60R 9/055 |
| | | | | 70/159 |
| 2012/0118926 | A1* | 5/2012 | Elliot | B60R 9/055 |
| | | | | 224/328 |

FOREIGN PATENT DOCUMENTS

| | | |
|---|---|---|
| DE | 20209786 U1 | 9/2002 |
| EP | 2322382 A1 | 5/2011 |

OTHER PUBLICATIONS

International Search Report and Written Opinion (ISR-WO) of the International Searching Authority for International Appl. No. PCT/EP2016/065480, European Patent Office (EPO), Rijswijk, The Netherlands, dated Oct. 13, 2016, 10 pages.

* cited by examiner

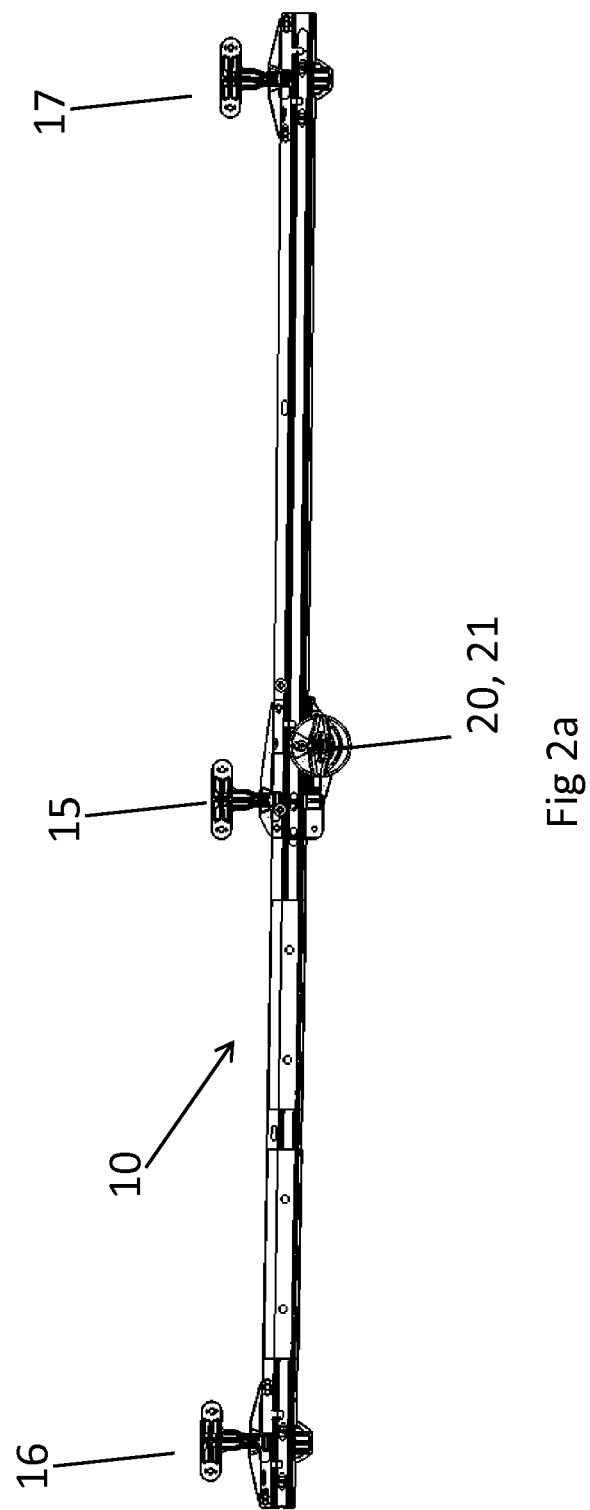

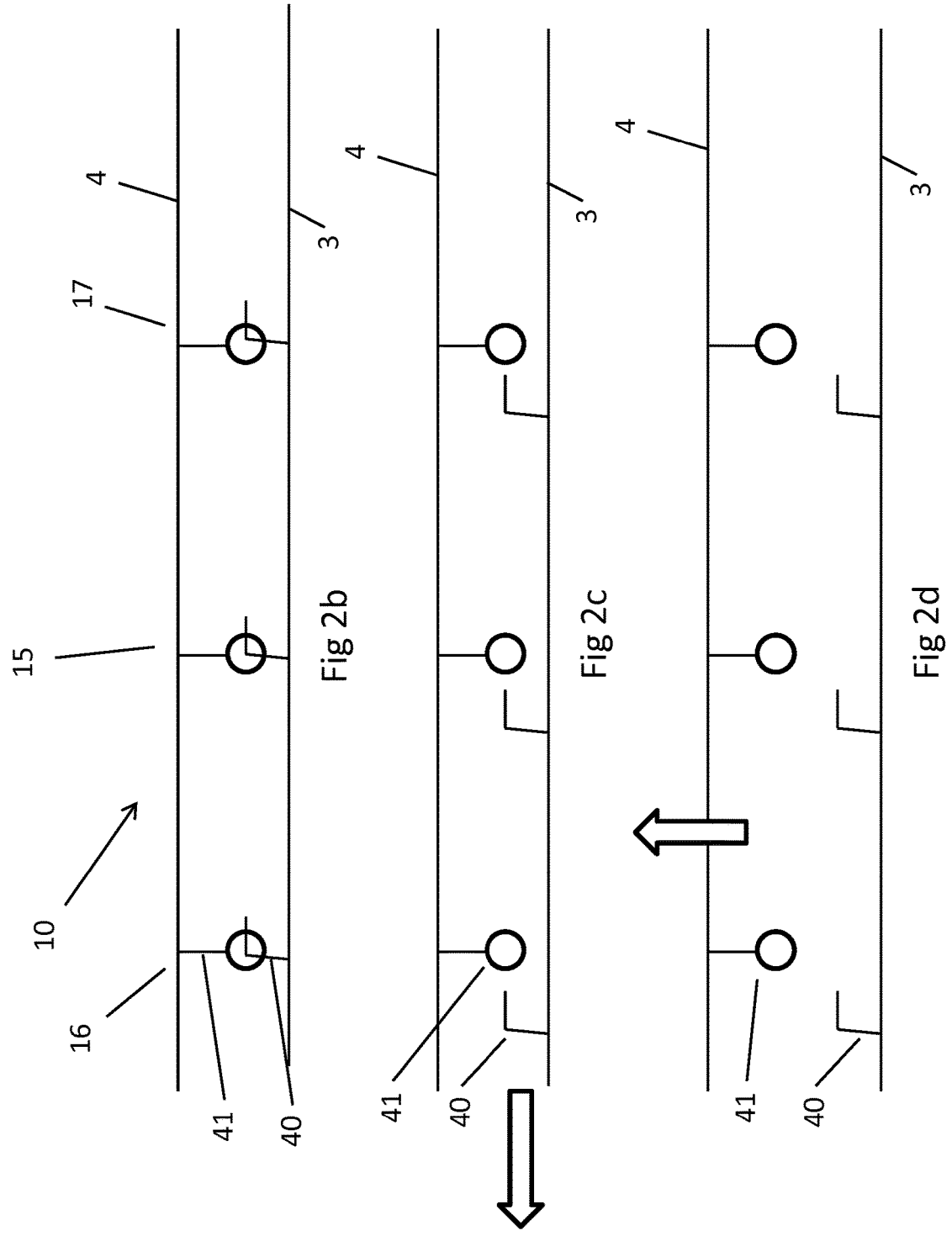

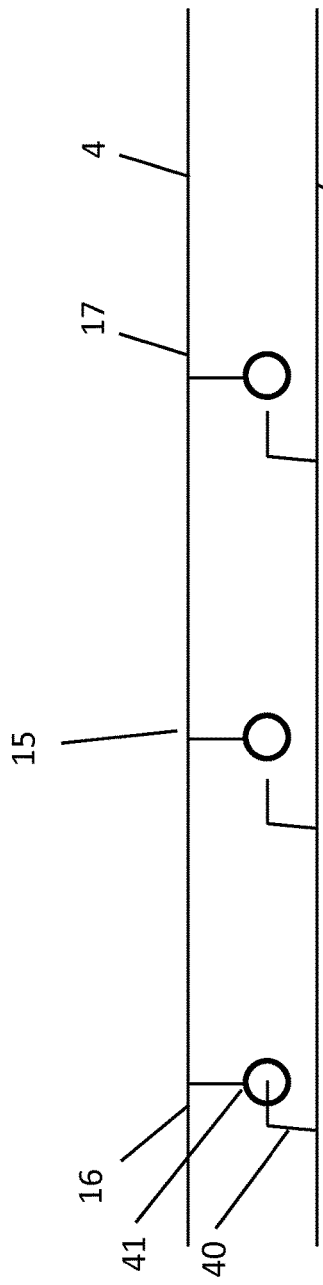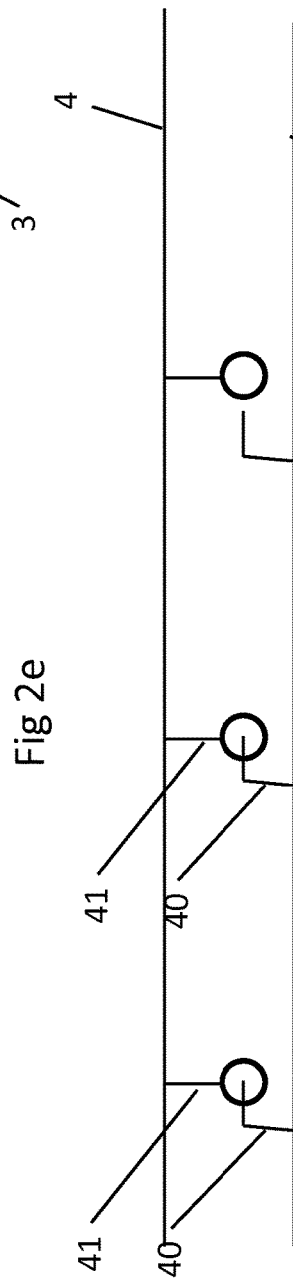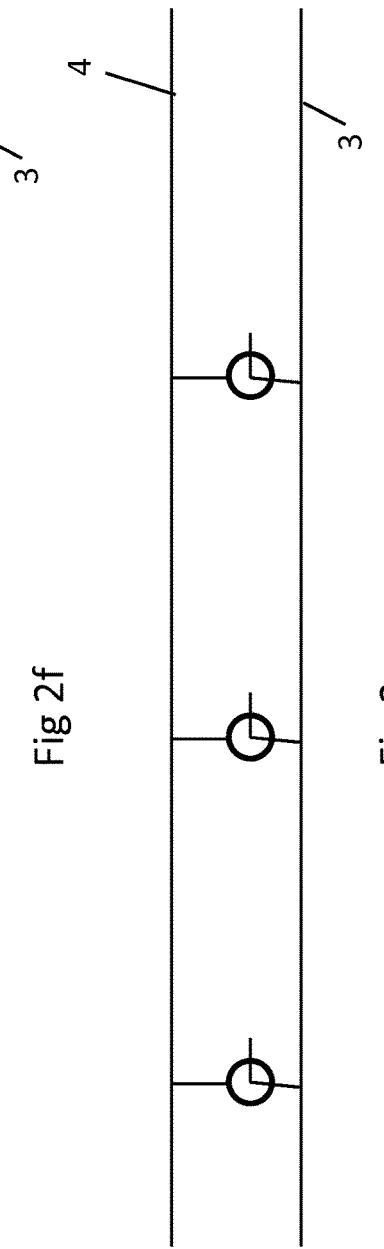

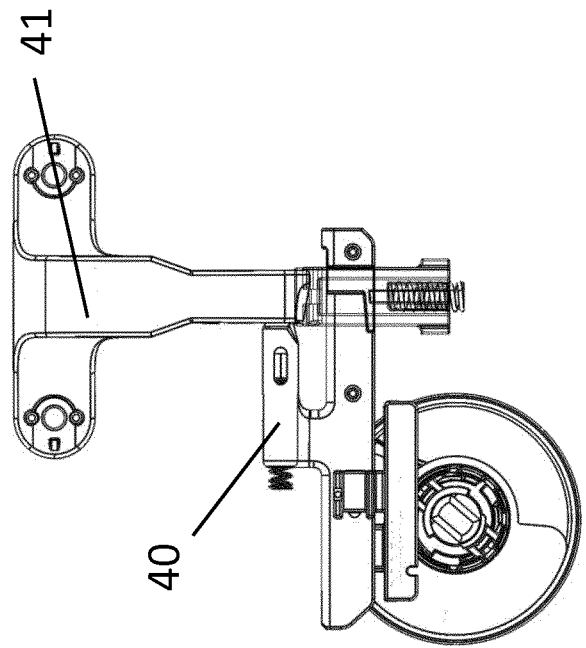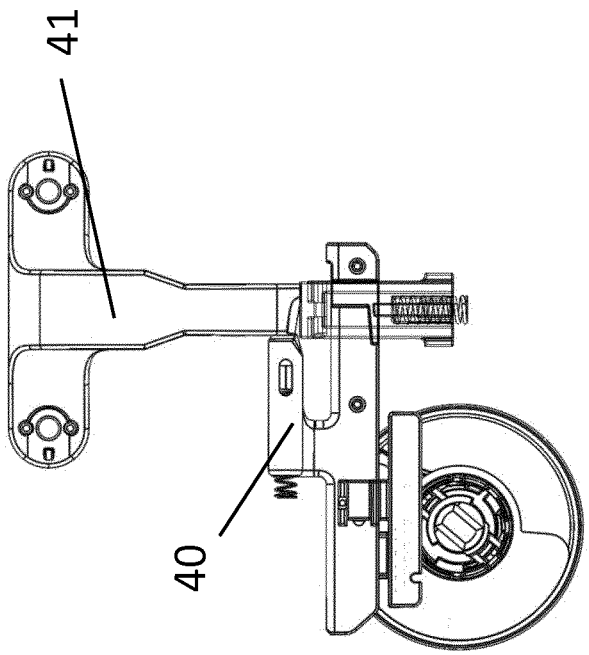

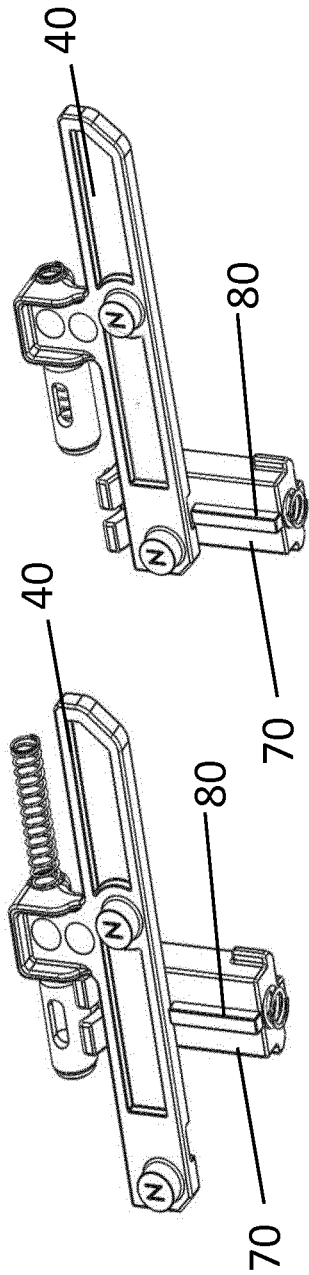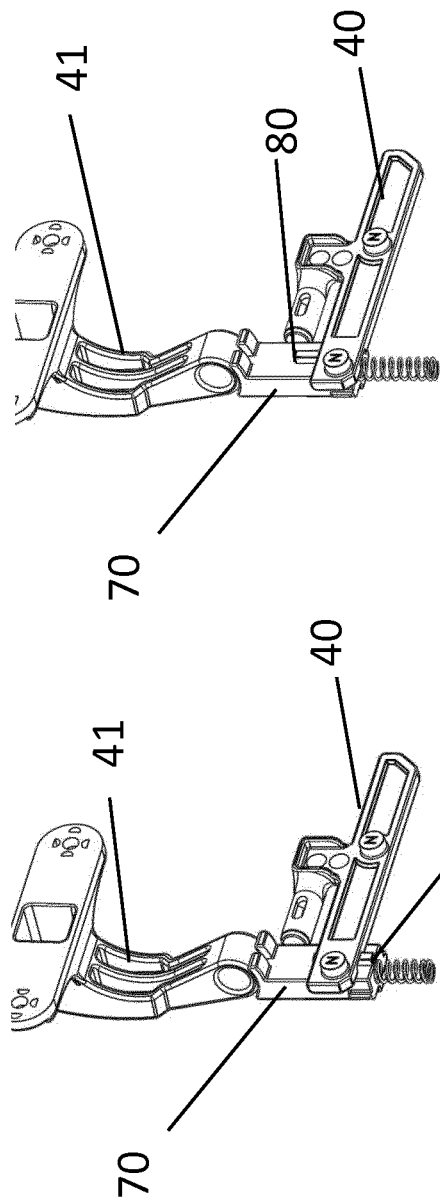
Fig 15a  Fig 15b  Fig 15c  Fig 15d

LOAD CARRIER COMPRISING A LOCK ARRANGEMENT

TECHNICAL FIELD

A load carrier for a vehicle, especially a vehicle mountable load carrier, having a lock arrangement comprising at least two individual lock sites and which permits sequential locking of each of the lock sites of the lock arrangement.

BACKGROUND

Load carriers for vehicle, and especially roof boxes for vehicles, are widely used to provide for an enhanced loading capability to vehicles. Roof boxes for vehicles are especially useful as they utilize a space of the vehicle not otherwise utilized.

Roof boxes generally have a base and a lockable lid and very often a longitudinal form to provide good volume with relatively low wind resistance. Due to the elongated form of the roof boxes, the lock arrangements are subjected to special requirements. It is desirable to lock the lid at a plurality of lock sites to effectively retain the lid to the base in a safe manner. Further roof boxes are generally manufactured in light weight material such as fiber reinforced composite based material. Although such material is strong and tough, it can be slightly flexible especially when larger pieces are used.

From a safety perspective it is very important that the roof box is properly locked before a user drives away with the vehicle. An insufficiently locked roof box can run the risk of being accidentally opened during motion. It is further a higher risk that an insufficiently locked roof box may be accidentally opened in case of an accident.

One lock system having three lock sites for a roof box is disclosed in European patent application no. EP2322382. The lock sites are interconnected via sliding bars to operate the individual lock sites to and enabling them to open and close simultaneously. Likewise The US patent application no. US20120118926A1 disclose a similar solution having a rotatable rod, generally referred to as a drive bar, which provides a rotational connection between three latch assemblies.

The above mentioned solutions have drawbacks however. The solutions may appear to have been locked properly while there still may be lock bolts, or lock pins, which are not fully engaged with the corresponding mating part, thus providing a lock arrangement which may be insufficiently locked. Further, the user gets limited information if the lock arrangement has been properly locked or not.

A good lock arrangement should not only be easy to lock, but easy to lock properly. There should be clear and reliable indications of whether the lock arrangement has been properly locked. A good lock system should further be flexible in terms of being adaptable to the specific load carrier in which it is intended to be used.

SUMMARY

It is an object of the present invention to provide for a solution, or to at least reduce the drawbacks mentioned above, or to provide for a useful alternative. The objects are at least partly met by a load carrier comprising a base and a lid. The load carrier comprises a lock arrangement arranged on the base and/or the lid, to lock the lid to the base. The lock arrangement comprises at least a first and a second displaceable lock element arranged at a distance from each other and being operable between a locked position and an unlocked position. The first and the second lock elements are arranged to respectively engage with a first and a second lock member arranged on the opposing base or lid when being positioned in the locked position. The lock arrangement further comprises an elongated actuation element in working cooperation with the first and the second lock element. An actuator arranged to displace the elongated actuation element from a locked position to a first position and thereby displacing the first and the second lock element from the locked position to the unlocked position. The first lock element and the second lock element are connected to the elongated actuation element so that they can be sequentially displaced from the unlocked position to the locked position.

The locked position to which the first lock element and the second lock element may be sequentially displaced, may be a preliminary lock position, wherein the first lock element and the second lock element may be subsequently positioned to a full lock position, either sequentially or simultaneously.

The load carrier of the present invention provides a load carrier with an improved lock arrangement. The load carrier is preferably a vehicle mountable load carrier such as a roof box or similar. The lock arrangement is secure in terms of that it is easy to properly lock. The lid for example can be pushed down by a user using only one hand, and does not need simultaneous locking of each lock. It enable the individual lock elements to be positioned in a preliminary lock position, and to permit the individual lock elements to be fully locked when the last of the lock elements has been pushed into engagement with the corresponding lock member.

The load carrier may be provided with two or more lock elements, such as three, four, five or more lock elements cooperating with the elongated actuation element.

The first lock element may be displaced, preferably rotated or translated or combinations thereof, to engage with the first lock member without the displacement of the elongated actuation element. Preferably the first lock element may be displaced by a predetermined distance and/or angle. Each lock element may have a limited degree of freedom with respect to the elongated actuation element, i.e. the connecting element. This permits them to be displaced a limited distance with respect to the elongated actuation element. The limited distance may be defined by the length of an elongated aperture arranged in the elongated actuation element or by the length of a guiding track for example.

The second lock element may retain the elongated actuation element from displacement back to the locked position. When the first lock element is displaced a limited distance with respect to the elongated actuation element, the elongated actuation element is advantageously retained in the first position and not returned to the locked position until all of the lock elements are displaced to engage with the corresponding lock member. The elongated actuation element may be retained in the first position in different manners. It has been found advantageous that the remaining lock element cooperates with the elongated actuation element to retain the elongated actuation element in the first position, or in an intermediate position.

The elongated actuation element may be returned to a first intermediate position after displacing the first and the second lock element, preferably simultaneously, from a locked position to an unlocked position.

The elongated actuation element and the second lock element can be simultaneously displaced to a locked position. Once the first lock element has been displaced to a locked position, or to a preliminary lock position, the remaining second lock element can be displaced to the locked position together with the elongated actuation element. If the lock arrangement comprises more than two lock elements, it is the last lock element which is simultaneously displaced to the locked position with the elongated actuation element. The elongated actuation element is thus not returned to the locked position until all lock elements are engaging all the lock members.

The elongated actuation element may be displaced to a position, a first immobilizing position, in which the first and the second lock element are prevented from displacement to the unlocked position. The elongated actuation element is in this position retaining the first and the second lock elements from being displaced from the locked position. It enables independent, non-sequential locking of the lock elements.

The first and second lock elements are individually biased towards respective locked position by a first and a second biasing member. Each lock element is preferably biased towards respective locked position. When the lock elements are displaced to the unlocked position, the biasing member is preferably tensioned so that the biasing force is continuously acting on the lock element. As mentioned, the first and the second lock elements are arranged to respectively engage with a first and a second lock member arranged on the opposing base or lid when being positioned in the locked position.

The first and the second lock element may extend along a first center axis wherein the first center axis is parallel with the elongated actuation element. The direction if displacement of the elongated actuation element is preferably parallel at least along a portion of the elongated actuation element with the first center axis. By displacing them parallel with the same center axis provide a relatively thin lock arrangement which require little space. As the lock arrangement may be arranged inside of the load carrier, space is generally precious.

The first and the second lock element may be simultaneously displaced together with the elongated actuation element from a locked position to an unlocked position. All of the lock elements can thus be unlocked together and simultaneously.

The elongated actuation element may be manufactured from different materials. It may be a rigid element such as a rod, or a flexible element such as a wire. The elongated actuation element is preferably a flat elongated actuation element, preferably manufactured from a material which permits translation, i.e. is form stable in the longitudinal direction, but is still somewhat flexible in terms of that it can bend. This enables the elongated actuation element to be formed along the interior of the load carrier for example, such as along a curved side wall of the load carrier for example. A suitable flat elongated actuation element is from 1-3 mm thick, 5-50 mm wide and 500-3000 mm long.

The elongated actuation element may be displaced by rotation, translation or combinations thereof. A preferred displacement is actuated by translating the elongated actuation element, preferably in the longitudinal direction of the elongated actuation element.

It has been found advantageous if the first and the second lock elements are displaceably connected to the elongated actuation element, preferably all of the lock elements are displaceably connected to the elongated actuation element. The lock elements are preferably connected to the elongated actuation element via a connection which permits the elongated actuation element to operate the lock elements but still permits each lock element to be displaced, preferably translated, with respect to the elongated actuation element.

The first and/or the second lock element may be connected to the elongated actuation element via a guiding track and a guiding track cooperating element such as a protrusion. The guiding track permits the guiding track cooperating element to be displaced a limited distance with respect to the elongated actuation element. The limited distance is preferably from 3-40 mm, more preferably from 5-30 mm. The limited distance is preferably substantially parallel, or parallel, with the elongated element, and the longitudinal extension of the elongated element.

The guiding track may be a groove or an aperture arranged in the elongated actuation element. The protrusion may be arranged on the lock element. The groove and/or aperture are preferably elongated having a main elongation from 3-40 mm, preferably 5-30 mm, more preferably 15-25 mm.

The elongated actuation element runs inside of a housing at least between the first and the second lock element. The elongated actuation element may be positioned inside of a protective housing to prevent the elongated actuation element to get caught in any load transported by the load carrier. Such housing may also be used to structurally provide support for the lock element for example.

The housing may comprise apertures, preferably elongated apertures, wherein the first and the second lock elements engages the elongated actuation element through the apertures. The number of apertures is preferably corresponding to the number of guiding tracks or apertures arranged on the elongated actuation element. The elongation of the elongated apertures of the housing may substantially correspond to the main elongation of the groove or aperture of the elongated actuation element.

At least the first lock element, preferably also the second lock element, may be positioned in a preliminary lock position. In the preliminary lock position, the first and/or the second lock element is engaging the corresponding lock member. In the preliminary lock position, the lid of the load carrier is retained to the base but not fully locked thereto. This enable a user to easily lock the lid and sequentially engage the lock elements until the last of the lock elements are engaging the corresponding lock member.

The first lock element and/or the second lock element subsequently may be positioned to a full lock position, in which the displacement of the first and/or the second lock element is prevented by the elongated actuation element. The elongated actuation element can thus function as a lock to all of the lock elements to prevent them from being displaced from the locked position to the unlocked position. It should be noted that the first lock element and/or the second lock element may thus be positioned in a preliminary lock position and in a full lock position.

It has been found to be advantageous that if the actuator comprises a key to lock and/or unlock the actuator, the key is only removable when all locks are locked, i.e. when all of the lock elements are in a full lock position, or in a lock position. Optionally the key is only removable when the elongated actuation element is in a lock position, i.e. preventing the lock elements from displacement from a locked position to an unlocked position.

The lock arrangement may further comprise at least one lock element blocking member. The lock element blocking member are arranged to temporarily block the first lock element from reaching the locked position when being in an extracted position. Each lock element may be provided with a corresponding lock element blocking member. The lock elements positioned in the preliminary lock position can be positioned to the locked position when all the lock element blocking members are pressed down. If only one lock element is not displaced to the lock position, the key is not removable.

The lock element blocking member may be biased by a biasing member towards the extracted position. The mentioned biasing member may be arranged to impart the lock element blocking member with a force adapted to push the lid open. The lock element blocking member is preferably arranged so as to engage with the lock member when closing the lid. The lock element blocking member may be adapted to bias the lock member to thereby open the lid. The lid may thus be self-opening in terms of that when the lid is unlocked, the lid is pushed upwards at least a distance enough so that a user may grasp about the lid to open it a remaining distance.

The lock arrangement, and preferably the first and second lock elements, may form a part of a lid hinge arrangement pivotally connecting the lid with the base and enabling the lid to be opened from two different sides. The lid may thus be arranged to pivot about two different pivot axes arranged parallel with each other.

As mentioned above, the lock arrangement comprises an actuator arranged to displace the elongated actuation element from a locked position to a first position and thereby displacing the first and the second lock element from the locked position to the unlocked position. The actuator may form, or comprise, a displaceable indicator. The displaceable indicator may be arranged to the elongated actuation element so that the displaceable indicator is displaced as a function of the displacement of the elongated actuation element. This can be used to identify the status of the lock elements. A user may thus be made aware of whether the lid is properly locked to the base or not. It should be noted that the actuator disclosed herein may be used separately from the lock arrangement disclosed herein. Hence the actuator and the components and features associated with the actuator may be used with other lock arrangements.

The actuator may be rotatable about a first rotation axis. The first rotation axis may be arranged substantially perpendicular to the elongated actuation element. Instead of a rotatable actuator, the displacement may be implemented by a translatable actuator, such as a slideable handle or the like.

The actuator may be rotatably connected via a gear to the elongated actuation element.

The actuator may comprise a key cylinder, operable via a key. The key cylinder may be connected to the gear. The rotational motion of the key may thus be transferred to the gear. The elongated actuation element may be provided with a cam track adapted to be arranged in working cooperation with the gear.

The actuator may comprise at least one key receiving portion, such as a protruding support member. The at least one protruding support member may be arranged to provide structural support to the key, preferably enabling the rotation of the key in the key cylinder by the rotation of the at least one protruding support member. This may assist in preventing the key from accidentally break when a user turns the key to unlock the lock arrangement.

The lock arrangement may comprise at least one lock element blocking member adapted to prevent a corresponding lock element form being displaced from the unlocked position to the locked position, and/or the preliminary lock position. The at least one lock element blocking member is configured to be displaced by a corresponding lock member arranged on the lid, or on the opposing base or lid.

The load carrier described herein provide good ergonomic features in terms of that it permits a user to close the lid of the load carrier using only one hand. It may further be provided with visual, tacit and/or audial feedback to the user. It may further be arranged to sequentially provide a user with visual, tactile and/or audial feedback when a user locks the lid to the base. For example a user may be rewarded with a click when each lock element engages the corresponding lock member.

The lock arrangement may be modular and symmetrical, e.g. for a symmetrical right and left side mounting in the load carrier. This may enable a cheaper production costs as the same lock arrangement can be used independently on the left or right position inside of the load carrier.

BRIEF DESCRIPTION OF THE DRAWINGS

Non-limiting embodiments of the present invention will be described in greater detail and with reference to the accompanying drawings in which;

FIG. 2a shows a lock arrangement without the roof box;

FIGS. 2b-2g show the principle of a lock arrangement disclosed herein;

FIGS. 14a-14h show elements of a lock site in greater detail during a closing procedure. and;

FIGS. 15a-15e show the lock element, lock element blocking member, and the lid member from different views to illustrate their working cooperation.

DETAILED DESCRIPTION OF PREFERRED EMBODIMENTS

Figure 1:
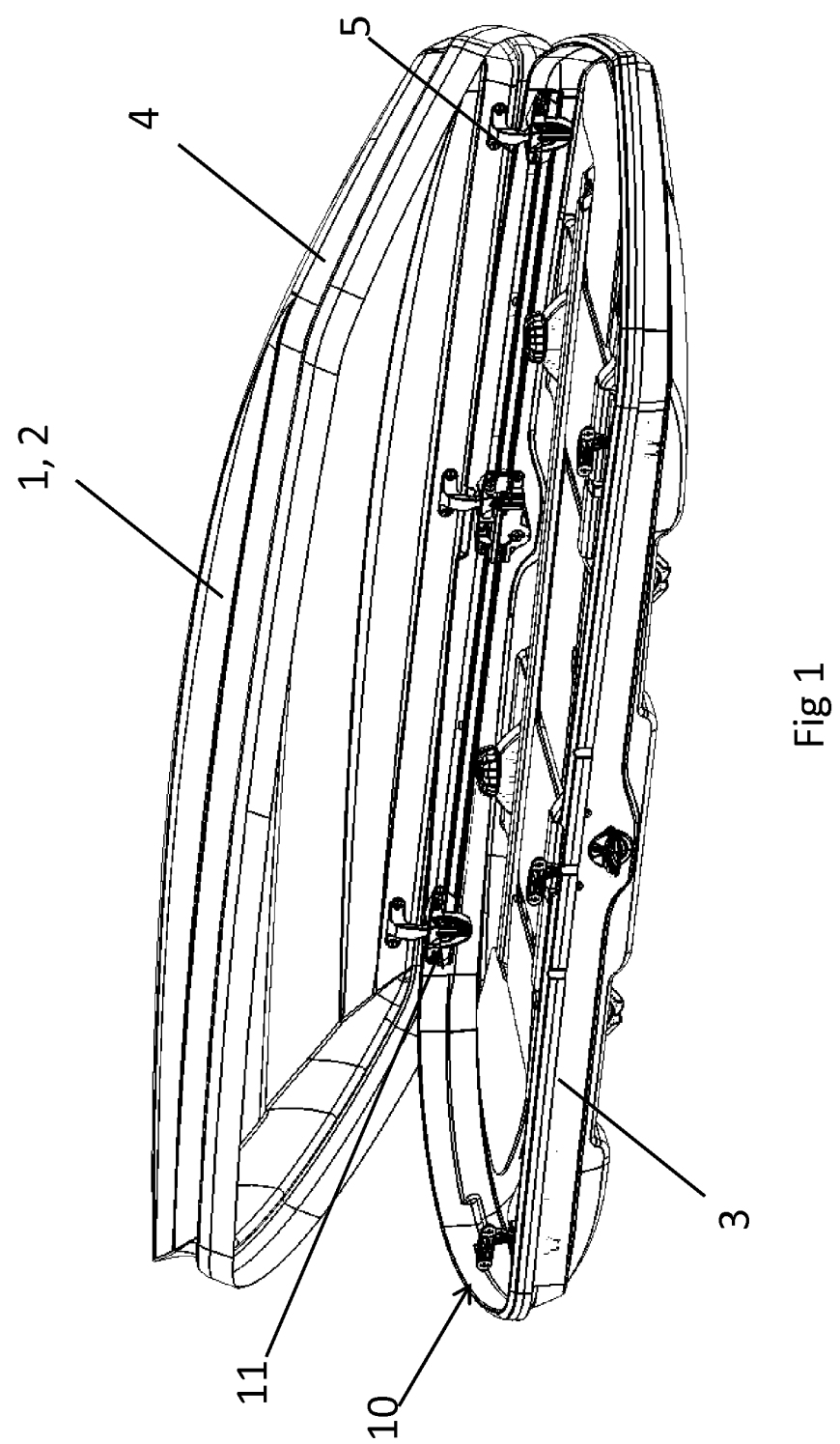
FIG. 1 shows a load carrier in the form of a roof box comprising two lock arrangements.

FIG. 1 shows a load carrier 1 in the form of a roof box 2. The roof box 2 is adapted to be attached on a roof of a vehicle (not shown) via conventional means. The roof box 2 comprises a base 3 and a lid 4. The lid 4 is attached to the base member via a pivot arrangement 5. The pivot arrangement enable the lid 4 to pivot between an opened position, as shown in FIG. 1, and a closed position (not shown). It should be noted that the load carrier 1 can be provided with another lid attachment system, the lid 4 could be slideably connected or simply loose with respect to the base 3 for example. A pivot arrangement is however preferred.

The load carrier 1 comprises at least one lock arrangement 10. The load carrier 1 may however be provided with two or more lock arrangements 10. In the shown embodiment, the load carrier 1 described with reference to FIG. 1 has a first and a second lock arrangements 10, 11. The lock arrangements 10, 11 are cooperating in the sense that they enable the lid 4 to be opened from two directions. Such arrangement is also referred to as a lid hinge arrangement. The lid 4 can be pivotally opened about a first and a second pivot axis substantially along the first and the second longitudinal side of the base 3. It should be noticed that the first and the second lock arrangements 10, 11 may be of the same kind as in the shown embodiment of FIG. 1, but it is within the boundaries of the present invention that the load carrier 1 comprises a first lock arrangement 10, and another pivot or lock arrangement of a different kind. The first and the second lock arrangements 10, 11 are arranged on the side walls of the base 3 and the lid 4 to pivotally connect the base 3 and the lid 4.

FIG. 2a shows the first lock arrangement 10 in greater detail. The first lock arrangement 10 comprises a first, a second and a third lock site 15, 16, 17. Each lock arrangement 10, 11 may be provided with two or more lock sites, such as 3, 4, 5, 6, 7, 8, 9, or more lock sites. A lock site is generally recognized by that it has a lock element which cooperates with a corresponding lock member to provide a lock.

The first lock site 15 comprises an operation mechanism 20, in the form of an actuator 21. The actuator 21 is arranged to enable a user to operate the lock arrangement 10, and thus unlock the lid 4 to permit access to the interior of the load carrier 1. Each lock site 15, 16, 17 can be sequentially locked and/or at least be sequentially positioned in a preliminary lock position. It should be noted that the lock arrangements 10, 11, or just one lock arrangement if only one is present, can be arranged on the lid 4 instead of the base 3.

The working principle of the lock arrangement according to the present invention will be described in general terms with reference to FIG. 2b-2g. FIG. 2b shows the lock sites 15, 16, 17 each with the lock element 40 and the lock member 41 in a locked position. All lock sites in this position are locked and retaining the base 3 and the lid 4. The lock sites have lock element 40 and a lock member 41 which are adapted to engage each other in a retaining manner when locked. These features will be described in greater detail below.

The lock element 40 and the lock member 41 may optionally form a hinge arrangement for the base 3 and the lid 4 but it is not necessary for the purpose of the present invention.

FIG. 2c shows the unlocking of the lock sites 15, 16, 17, i.e. simultaneously disengaging the lock element 40 from the lock member 41. The lid 4 can now be opened as indicated by the arrow in FIG. 2d. When the lid 4 is closed, the lock elements may sequentially be positioned to a locked position. In FIG. 2e, the locked position is a preliminary locked position visualized by that the lock element 40 is not fully engaging the lock member 41.

In FIG. 2f another lock element of another lock site, in this case the first lock site 15, has been displaced to a preliminary locked position. As can be noticed, the last lock element is still unlocked and is not engaging the lock member 41 at all. When a user presses down the last lock member 41, the lock element 40 of that lock site will together with the other lock elements 40 of the other lock sites is displaced to a full lock position simultaneously as is indicated in FIG. 2g. The lock elements 40 are operated via an actuation element, e.g. a drive bar as will be described in greater detail below. This operation could be performed in other ways however.

Figure 3:
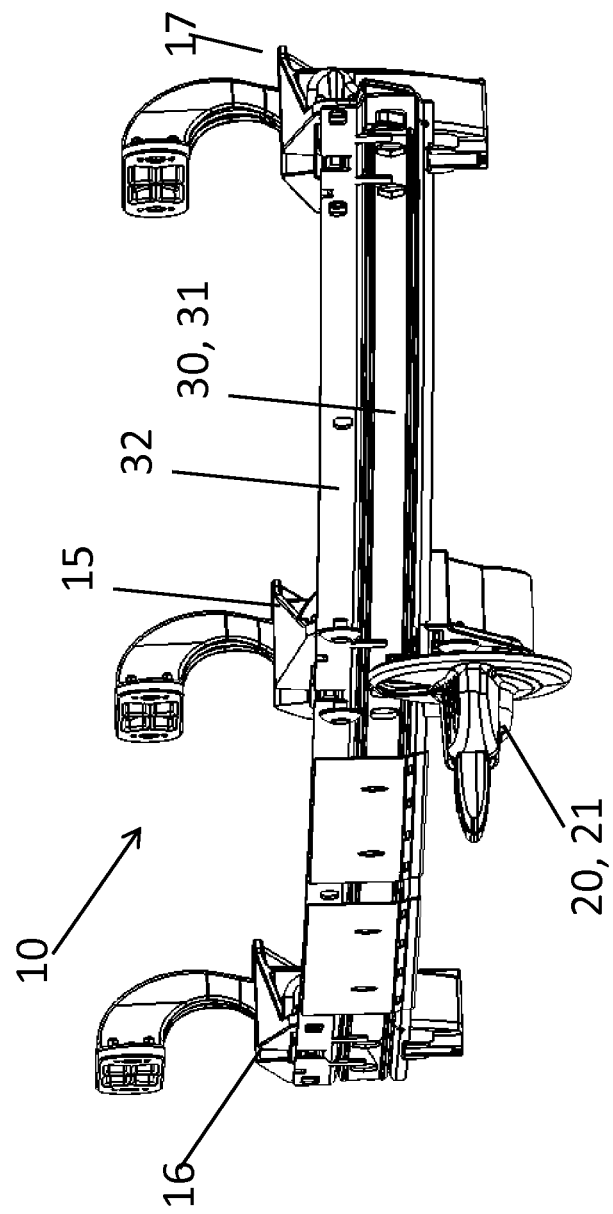
FIG. 3 shows the lock arrangement of FIG. 2a with a view in perspective.

FIG. 3 shows FIG. 2a in greater detail and in a perspective view. FIG. 3 shows the first lock arrangement 10, the first, the second and the third lock site 15, 16, 17 and the actuator 21. FIG. 3 also shows an elongated actuation element 30 or actuation bar 30. The elongated actuation element 30, in this case a flat elongated actuation element 31 is preferably somewhat flexible permitting the elongated actuation element 30 to be slightly curved. As can be gleaned from FIG. 3, the elongated actuation element 30 is slightly curved to compensate for the curved form of the base 3 of the load carrier 1. The elongated actuation element 30 connects the first, the second and the third lock site 15, 16, 17 together and enables the actuator 21 to operate each of the lock sites 15, 16, 17. When operating the actuator 21, each of the first, the second and the third lock site 15, 16, 17 can be unlocked for example. The elongated actuation element 30 is displaceably attached, in this case slideably attached, to the interior of the base 3 via a housing 32. The housing 32 is also slightly curved in this case to follow the contours of the base 3.

The individual parts of the lock arrangement 10 will now be described in greater detail.

Figure 4:
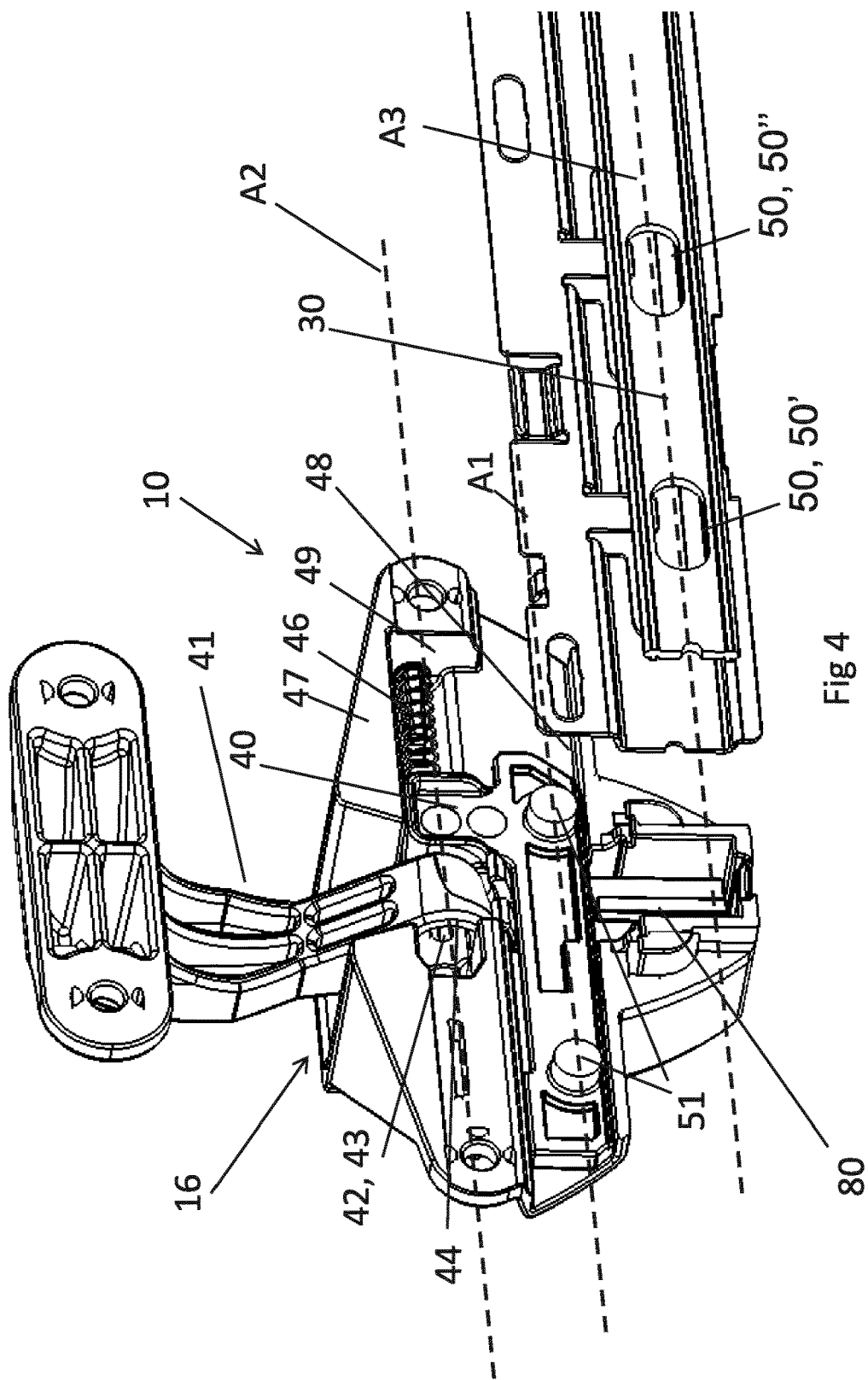
FIG. 4 shows the second lock site in greater detail and with a partly exploded view.

FIG. 4 shows the second lock site 16 in greater detail. The second lock site and the third lock site 17 are identical in function and structure, while the first lock site 15 differs in terms of that it is further provided with the actuator 21. A lock site, like the first, second and third lock sites 15, 16, 17 comprises a lock element 40. The lock element 40 is adapted to engage, or mate, with a cooperating lock member 41 arranged on the lid 4 (shown in FIG. 1). The lock element 40 can be displaced between a locked position and an unlocked position. In the locked position, the lock element 40 is fully engaging the lock member 41 of the lid 4. As will be described below, the lock element 40 can further be positioned in a preliminary lock position.

The lock element 40 comprises an engagement portion 42, in this case in the form of a pin 43. The lock the lid 4 to the base 3, the pin 43 of the lock element 40 mates in this case with an aperture 44 arranged on the lock member 41. Instead of having a pin 43, the engagement portion can be a hook or similar. The lock element 40 is displaced in the same direction, or at least substantially in the same direction, as the elongated actuation element 30 to translate to an unlocked position as will be described in greater detail below.

A biasing member 46 biases the lock element 40 towards the locked position, in this case towards the left when viewed as shown in FIG. 4. The biasing member 46 can be a helical spring as shown in FIG. 4 but other biasing members are possible such as a leaf spring, an elastic member such a rubber member or the like. It is also possible to position the biasing member on the opposite side at which the biasing member could bias the lock element 40 towards the locked position by imparting a pull force, instead of a push force on the lock element 40.

As is noticed, the lock element 40 is slideably arranged in a lock housing 47. The lock housing 47 provide a guide track 48 to the lock element 40. The guide track 48 provides for a predetermined track for the lock element 40 and permits it to slide along the predetermined track so that the lock element 40 can properly engage with the lock member 41. The lock housing 47 further comprises a biasing member support surface 49 onto which the biasing member 46 can brace against when biasing the lock element 40.

The lock element 40 has a main elongation which extends along a first centre axis A1. The engagement portion 42, in this case the pin 43, has a main elongation which extends along a second centre axis A2. As can be noticed, the first center axis A1 is parallel, or substantially parallel with the elongated actuation element 30.

The lock element 40 is displaceably connected to the elongated actuation element 30. The lock element 40 has a limited degree of freedom with respect to the elongated actuation element 30 so that the elongated actuation element can be displaced, or in the shown embodiment translated, a limited distance with respect to the lock element 40. The limited displacement is enabled via at least one guiding track 50 arranged on the elongated actuation element 30 and at least one protrusion 51 arranged on the lock element 40. In the shown embodiment, the lock element 40 is provided with two protrusions 51 and the elongated actuation element 30 is provided with elongated apertures 50', 50". Having two protrusions cooperating with two guiding tracks in this case two apertures, provide stability to the displacement of the lock element 40 and the elongated actuation element 30.

Figure 5:
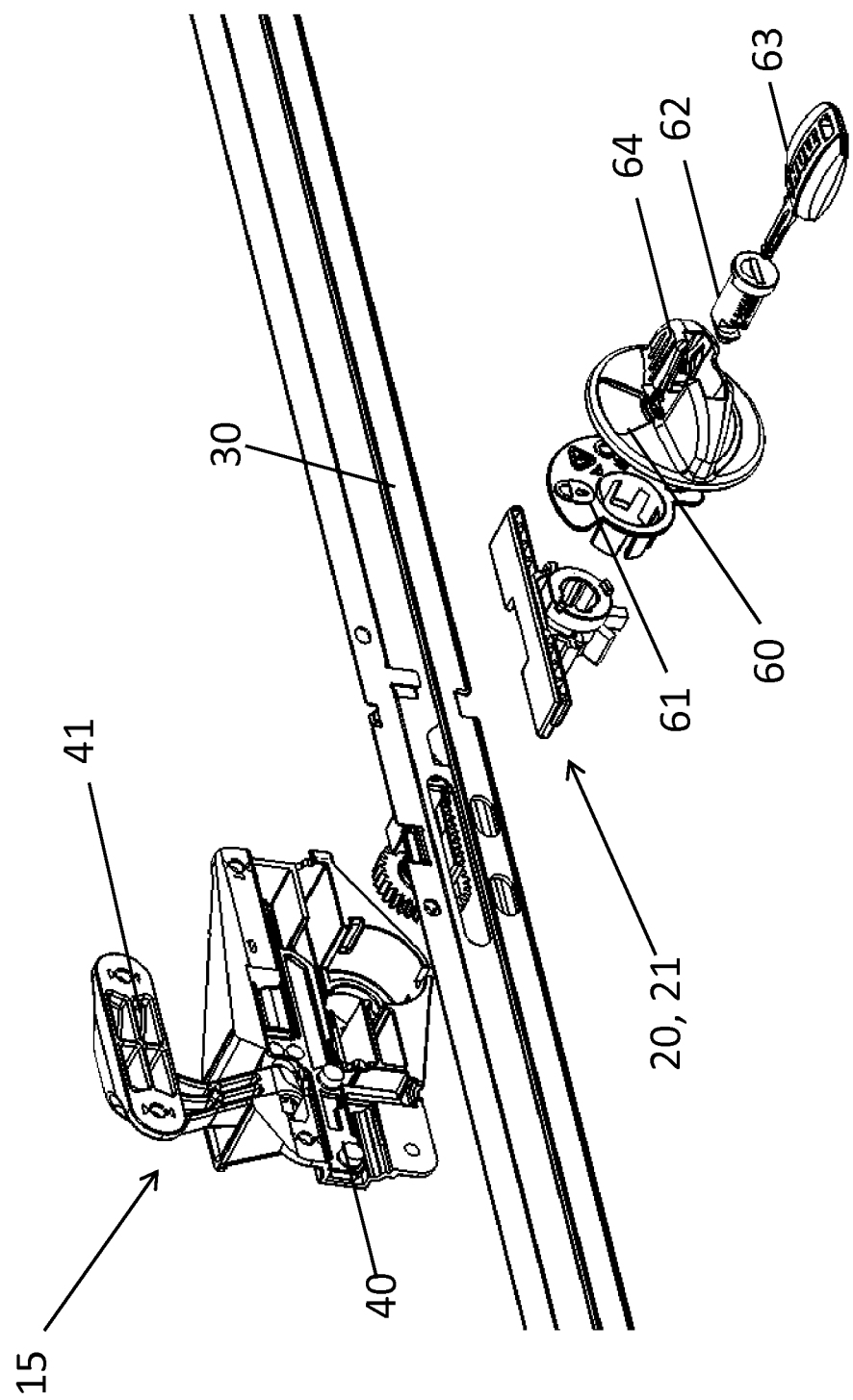
FIG. 5 shows the first lock site in greater detail and with a partly exploded view.
Figure 6:
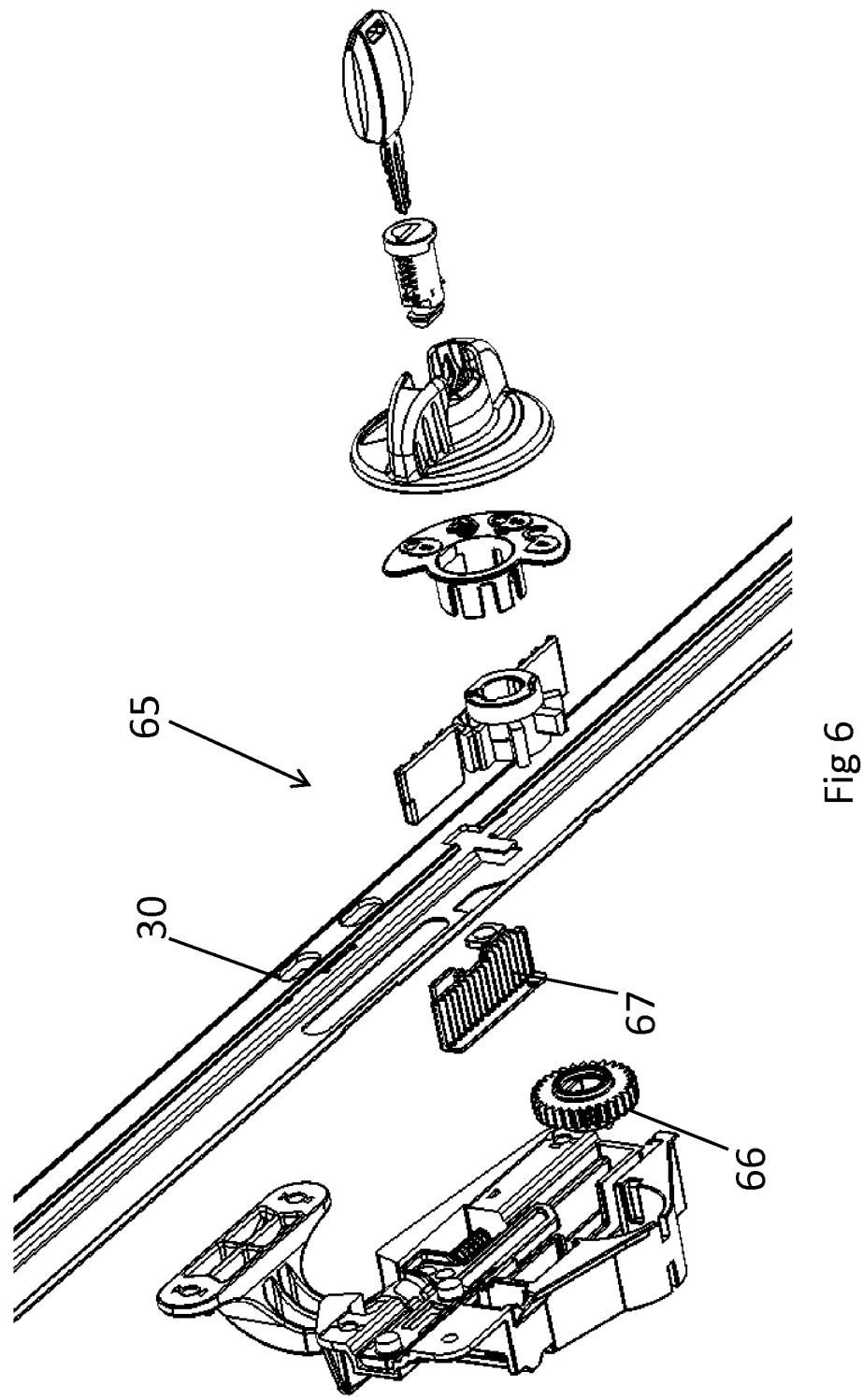
FIG. 6 shows the first lock site shown in FIG. 5 but with a perspective view towards the underneath of the lock arrangement.
Figure 7:
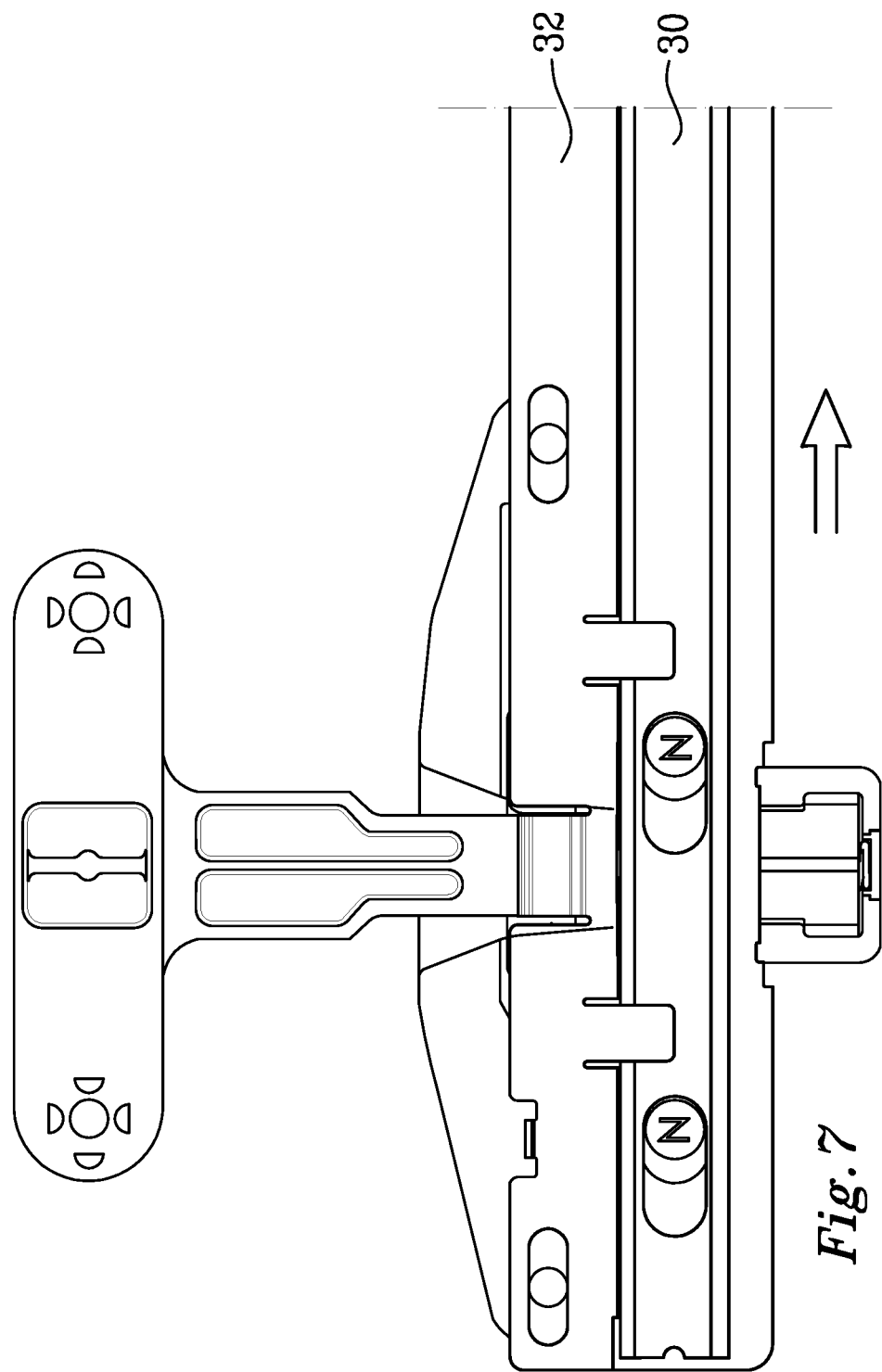
FIGS. 7-13 show the second lock site in greater detail and with different positions as the lock site is opened and closed, i.e. displaced between a locked, unlocked and locked position again.

FIG. 5 shows an exploded view of the first lock site 15 and in greater detail. FIG. 7 shows the exploded view of the first lock site 15 of FIG. 6 with a view from underneath to better illustrate some of the features thereof. FIG. 6 shows a lock element 40, a lock member 41 attached to the lid (not shown) of the load carrier, a lock housing 47, the elongated actuation element 30 and the housing 32 adapted to cover the elongated actuation housing 32. FIG. 6 also shows the operating mechanism 20. The operating mechanism, or the actuator 21, is as mentioned arranged to enable a user to operate the associated lock arrangement. The actuator 21 comprises a rotatable handle 60 which upon rotation displaces the elongated actuation element 30 to displace each of the associated lock elements 40.

A position indication disc 61 is positioned behind the rotatable handle 50 and function as a reference to the position of the lock elements 40 associated with the elongated actuation element 30, and with the elongated actuation element 30. The position indication disc 61 is in the shown embodiment not rotatable, but fixedly arranged at the lock arrangement 10.

Further associated with the rotatable handle 60 is a lock cylinder 62 operable via a key 63. The rotatable handle 60 comprises a key engaging element 64 adapted to engage with the key 63 after being inserted into the lock cylinder 62. Thus when rotating the rotatable handle 60, the key 63 is also rotated. This provides a protection against a user accidentally breaking the key. The key engaging element 64 is in the shown embodiment provided by a protruding slot into which the key 63 can be inserted. An advantageous feature is that the key 63 cannot be retracted from the lock cylinder 62 until all lock elements are fully engaging the lock members, or before the elongated actuation element 30 is back in the original position.

With reference to FIG. 6; associated with the rotatable handle 60 is also a torque transfer arrangement 65. The torque transfer arrangement transfer the rotational movement of the rotatable handle 60 to a translating motion displacing the elongated actuation element 30. The torque transfer arrangement 65 is in the shown embodiment comprises a gear 66 and a cam track 67. The rotation of the rotatable handle 60 is transferred to the gear 66 which displaces the cam track 67. The cam track 67 is in turn indirectly connected with the elongated actuation element 30 and thus transfers the translation to the elongated actuation element 30.

A biasing member is acting on the cam track 67 biasing the cam track 67, and thus the elongated actuation element 30 towards a lock position. The elongated actuation element 30 is thus striving back towards the lock position.

The function and operation of the lock arrangement 10 will hereafter be described in greater detail. FIG. 7 shows a portion of the lock arrangement 10 in greater detail and more specifically the second lock site 16. When a user rotates the actuator 21 the elongated actuation element 30 starts to translate to the right and thus be displaced along a displacement direction as indicted by the arrow. The rotating motion of the actuator 21 translates the elongated actuation element 30 in a horizontal direction.

The housing 32 which cover the elongated actuation element 30 functions as a protective sheet and is in FIGS. 7-13 illustrated as transparent in order to better visualize the displacement of the lock element 40. It should be noted that the housing 32 is an option, the elongated actuation element 30 could likewise be exposed to the interior of the load carrier if desirable.

Figure 8:
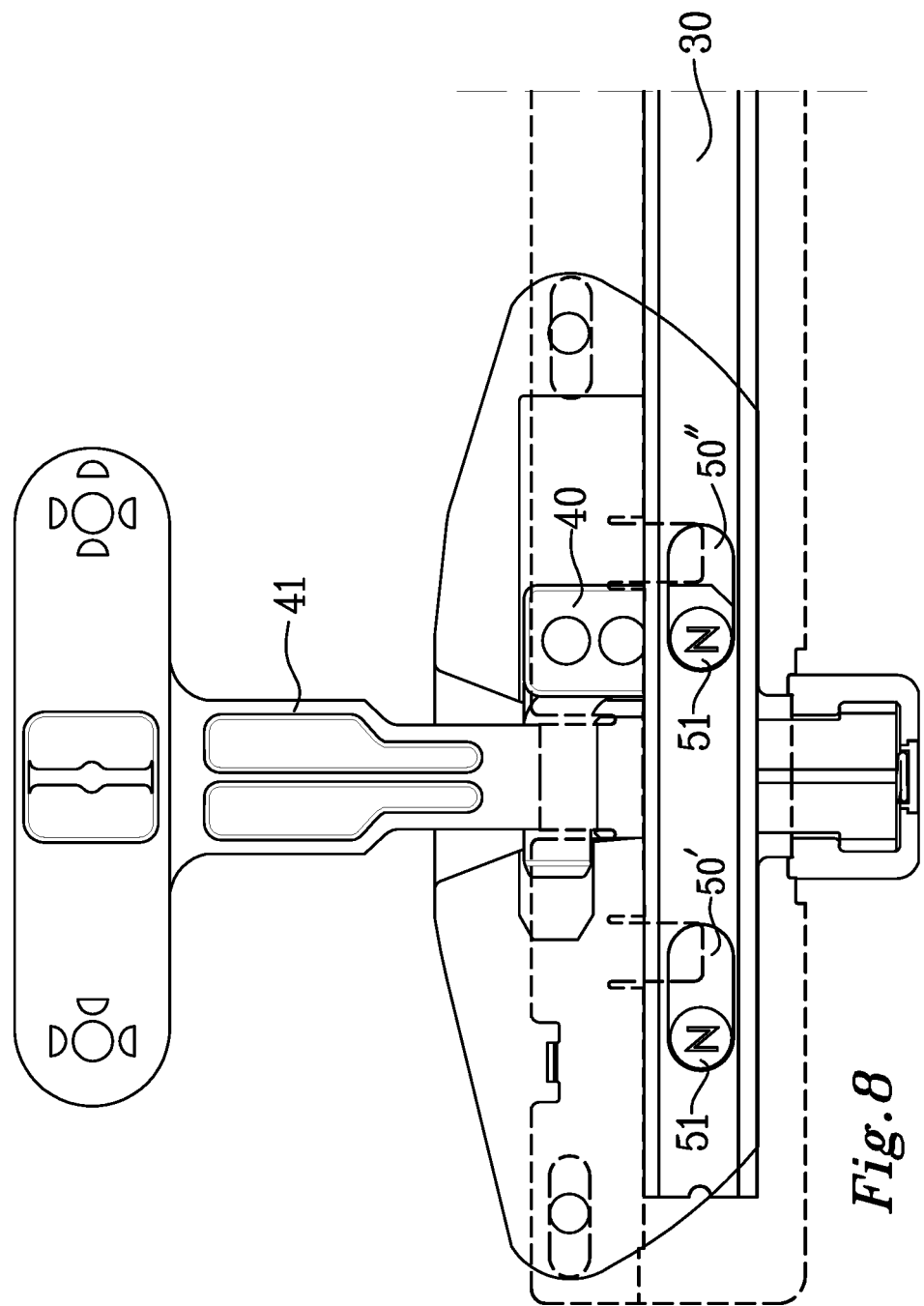

In FIG. 8, the elongated actuation element 30 has been displaced a distance defined by the elongated apertures 50', 50" of the elongated actuation element 30. The elongated actuation element 30 grasps about the protrusions 51 of the lock element 40 and is just about to retract all the lock elements 40 from engagement with the lock member 41 of the lid 4 (not shown).

Figure 9:
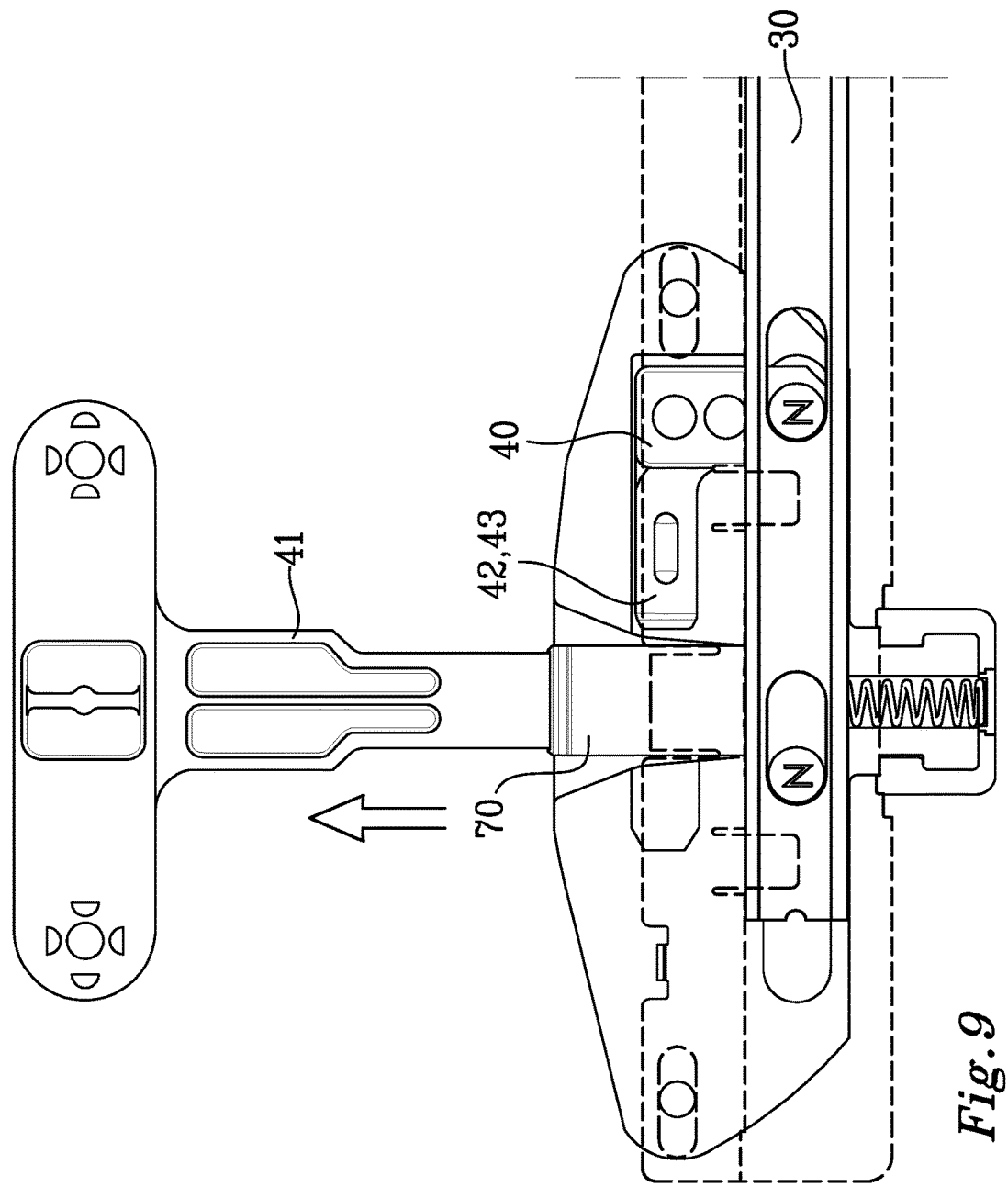

FIG. 9 shows how the elongated actuation element 30 has retracted the lock element 40 from an engaging position, i.e. the locked position, with the lock member 41 of the lid 4. As can be noticed, the pin 42 of the lock element 40 and more precisely the engagement portion 42 in this case the pin 43 is fully disengaged from the lock member 41 of the lid 4. When the lock element 40 is retracted to an unlocked position as shown in FIG. 9, the lock member 41 and thus the lid 4 is free to be opened. An advantageous optional feature is if the lid 4 is biased upwards by a lock element blocking member 70. The lock element blocking member 70 is adapted to block the lock element 40 from being biased back to the locked position but to stay in a ready position. If the lid 4 is biased via the lock member 41 the lid 4 will be pushed opened as indicated by the arrow in FIG. 9. Once the lock element blocking member 70 is in the extracted position, or elevated position, as shown in FIG. 9, the lock element 40 is obstructed from being displaced back to a locked position. It should be noted that the lock element blocking member 70 does not need to block the lock element 40 but could work simply as a biasing member to the lid. The lock element 40 could optionally or additionally be blocked by a stop pin, as described with reference to FIGS. 14a-14f for example.

Figure 10:
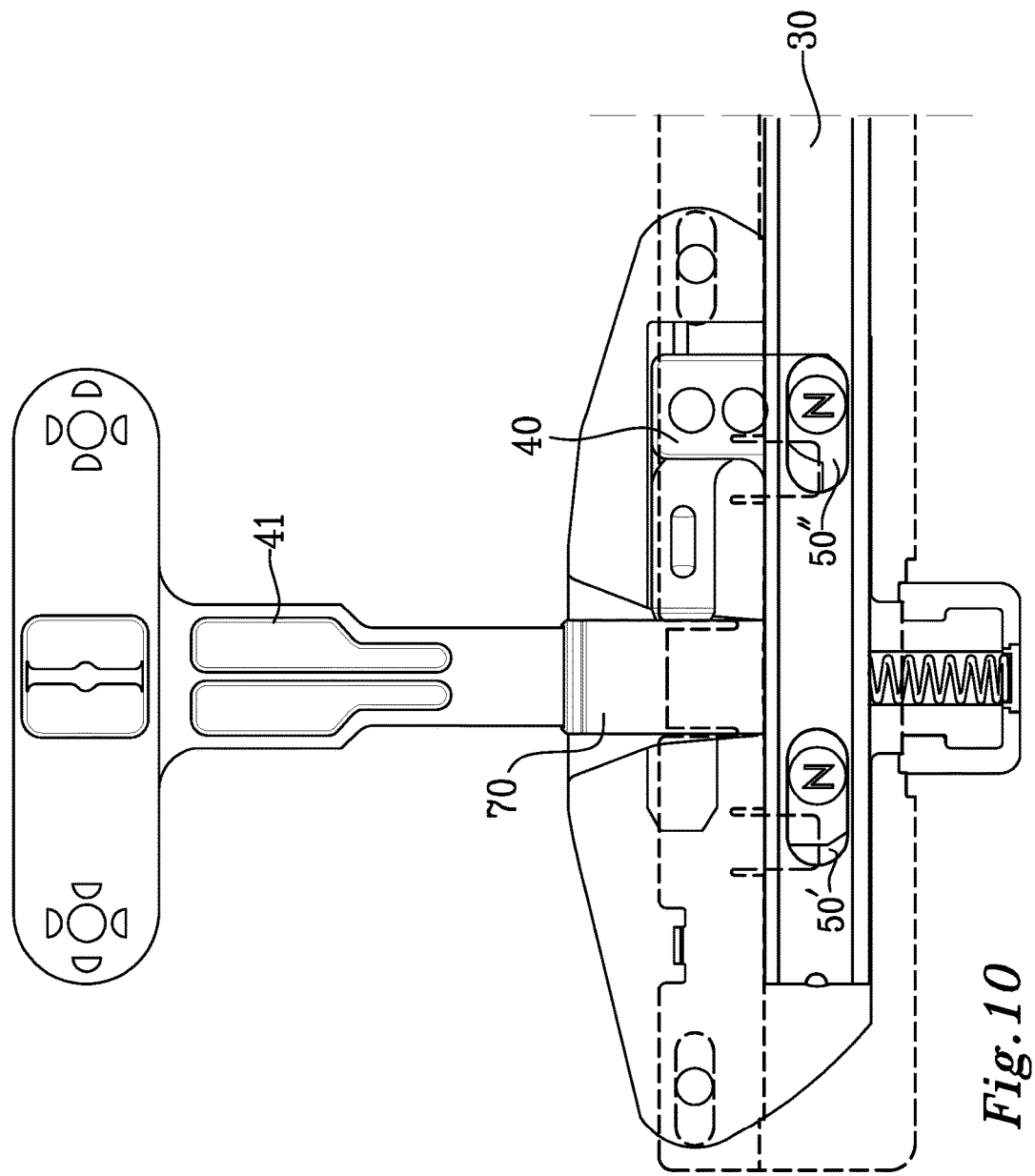

FIG. 10 shows the elongated actuation element 30 after being displaced back a distance corresponding to the length defined by the elongated apertures 51', 51" of the elongated actuation element 30. As can be understood, the lock element 40 is now temporarily free from engagement with the elongated actuation element 30 and can be displaced back a corresponding distance to an engaging position with the lock member 41 of the lid if the lock element blocking member 70 would not obstruct the lock element 40 from displacement. As the elongated actuation element 30 permits some degree of relative displacement with respect to the lock element 40 each lock element 40 can be individually displaced back to a lock position and/or a preliminary lock position.

Figure 11:
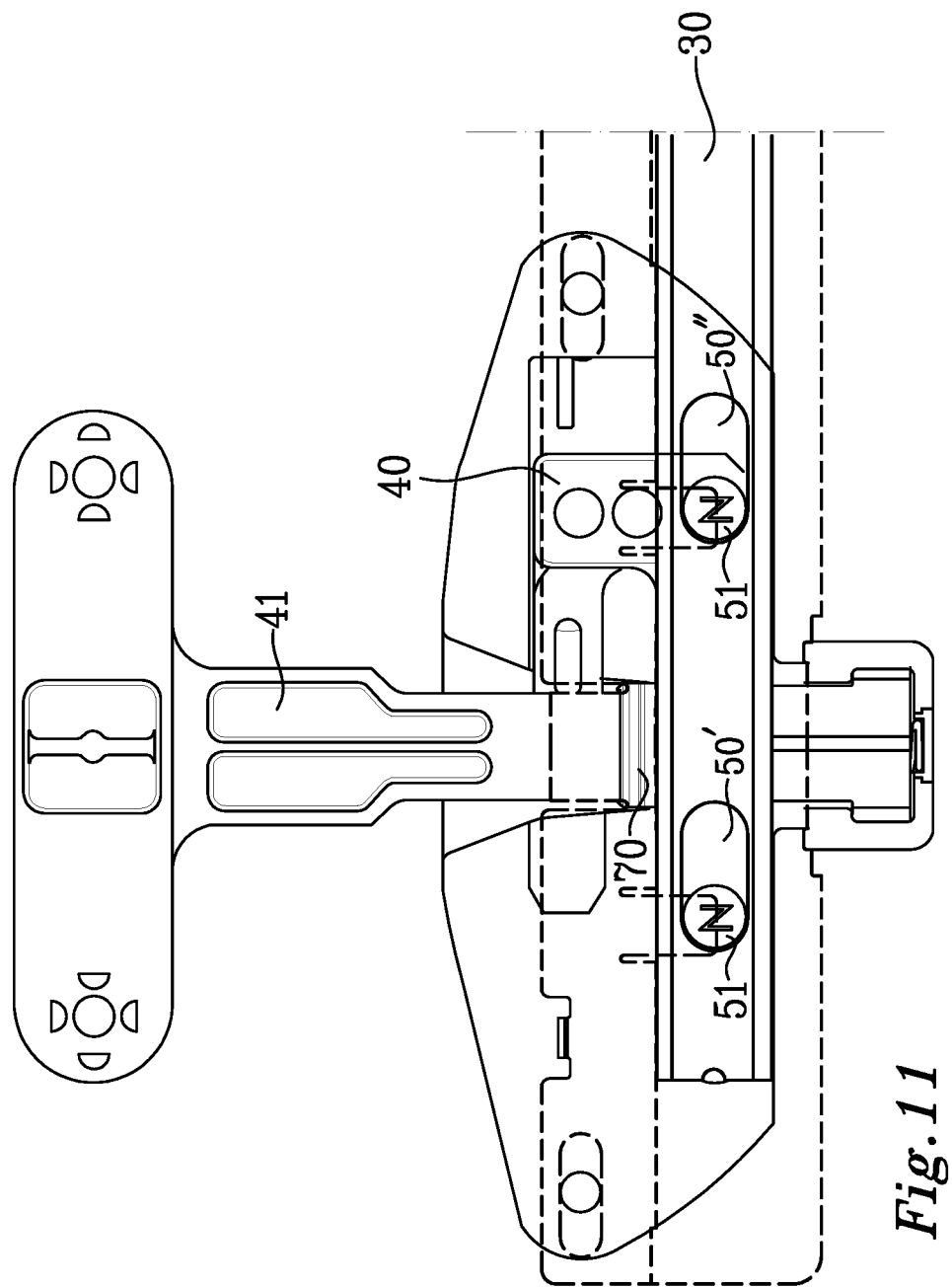

FIG. 11 shows the lock member 41 of the lid 4 after being pushed downwards and into engagement with the lock element blocking member 70, i.e. a user is closing the lid 4 of the load carrier 1 (shown in FIG. 1). As is noticed, the lock element blocking member 70 is displaced from the blocking position shown in FIG. 10, permitting the lock element 40 to automatically snap back into engagement with the lock member 41 of the lid 4. It should be noticed that the biasing member 46 (shown in FIG. 4) is not illustrated in FIG. 11. In FIG. 11, the lock element 40 is however not fully engaging the lock member 41 but is restricted from full engagement by the elongated actuation element 30. The protrusions of the lock element are stopped by the termination of eth elongated apertures of the elongated actuation element. The lock element is in this preliminary lock position retaining the lock member of the lid but is not yet fully engaging the lock member of the lid. The lock member of the lid is thus prevented from being removed, or disengaged, from the lock element blocking member, but the lock is not fully locked.

As can be gleaned, when two of the three lock elements 40 are positioned as shown in FIG. 11, the third lock element 40 will be positioned as shown in FIG. 10, an thus retain the elongated actuation element 30 from being displaced further to the left.

In practice, a user can close the lid 4 (shown in FIG. 1) with one hand and selectively preliminary lock each lock site. It permits a sequential locking of each lock site. The lock arrangement does not require that the lid is pressurized uniformly across the lid surface to get the lock element to engage with the corresponding lock member.

Figure 12:
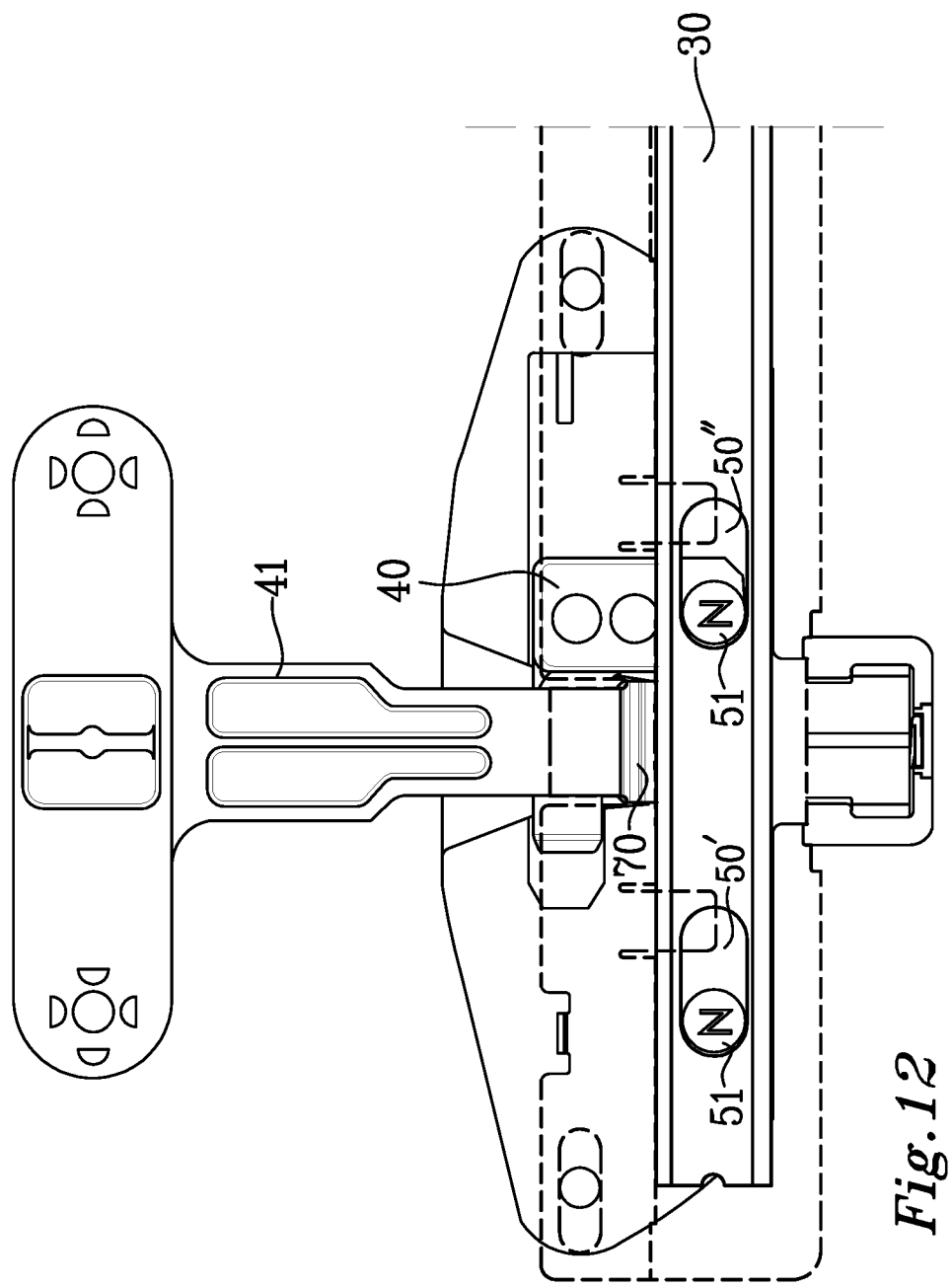

FIG. 12 shows the lock member 41 of the lid partly transparent. When the last lock element blocking member 70 is displaced downwards by the lock member 41 of the lid, the last lock element 40 is free to engage the lock element blocking member 70, thus going directly to a lock position without stopping in a preliminary lock position. The elongated actuation element 30 is then free to be displaced towards the left whereby the third and last lock element 40 can be displaced to a locked position. The lock element 40 is now fully engaging the lock member 41 of the lid.

Figure 13:
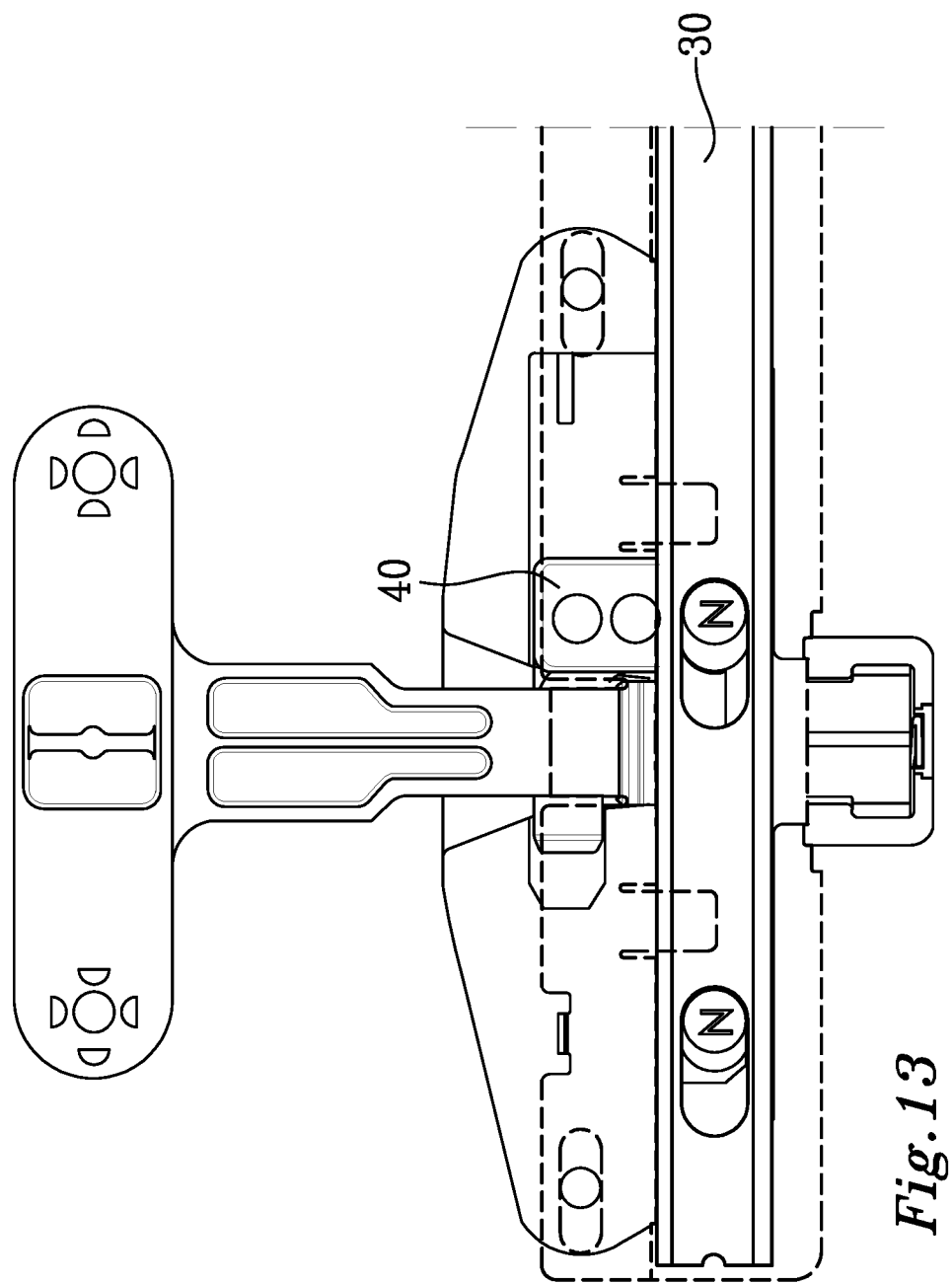

FIG. 13 shows the elongated actuation element 30 back to the original starting position, a lock position, in which the elongated actuation element 30 is preventing each of the lock elements 40 from displacement from the locked position towards the unlocked position. The elongated actuation element 30 is thus operating as a lock element retainer, retaining the lock elements 40 from disengaging the lock member 41 of the lid 4.

With reference to FIGS. 14a-14h, a lock safety function will be described in greater detail with respect to elements of a lock site of the lock arrangement.

Figure 14B:
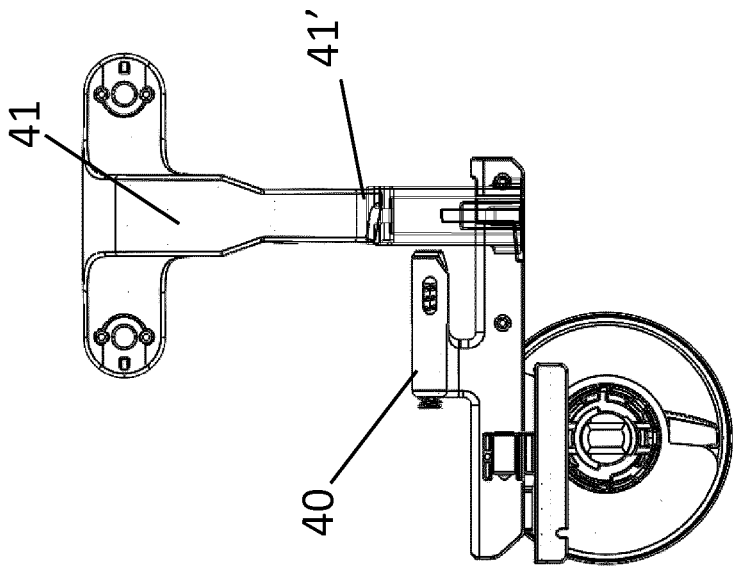
Figure 14A:
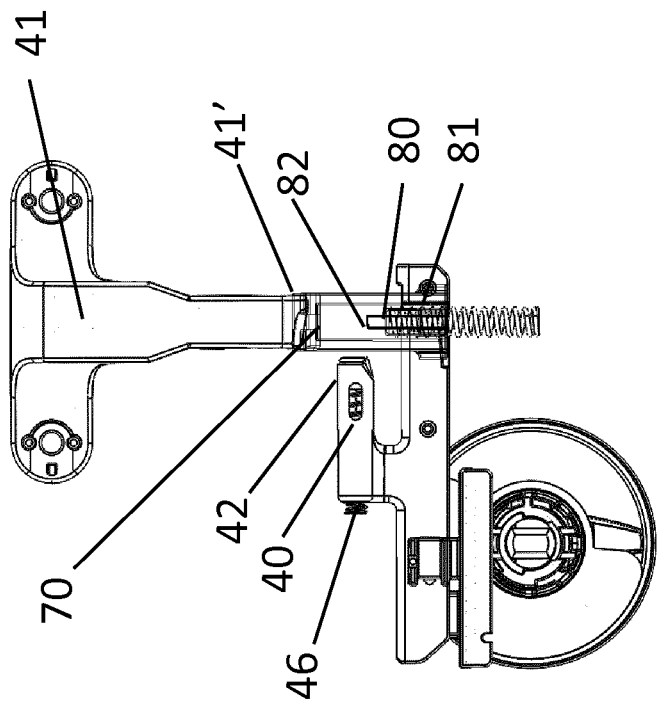

With reference to FIG. 14a, the lock safety function is configured to prevent a user from accidentally, or intentionally, push down the lock element blocking member 70 so that the lock element 40 is positioned in an obstructing position preventing the lock member 41 from engaging with the lock element 40 and thus the lid from being properly closed. The lock safety function is provided by a stop pin 80 arranged on, to, or in the proximity of, the lock element blocking member 70. In the shown embodiment, the stop pin 80 is arranged on the lock element blocking member 70 and is displaceable in a vertical direction synchronously with the lock element blocking member 70.

The lock pin 80 is biased, in this case by a spring 81 which is the same biasing member biasing the lock element blocking member 70, towards a raised position. FIG. 14a shows the lock site, i.e. the lock element 40 and the cooperating lock member 41 of the lid (not shown) when the lid is opened. The lock element 40 is resting on the lock element blocking member 70. It should be noted that the lock element 40 may have different surfaces which are resting against, i.e. positioned adjacent the lock element blocking member 70, in this case it is a surface which is not arranged on the pin 42, but on another surface of the lock element 40. FIG. 14b shows the FIG. 14a but without the spring 81 for the sake of clarity to better illustrate the contacting surface to the lock element blocking member 70. It is thus the slide portion of the lock element 40 which is provided with the contact surface and is adapted to be positioned adjacent the lock element blocking member 70.

Figure 14D:
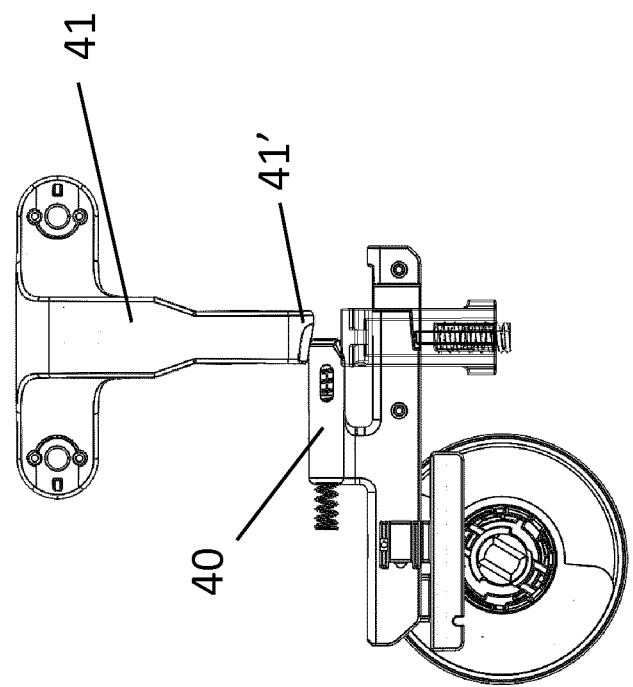
Figure 14C:
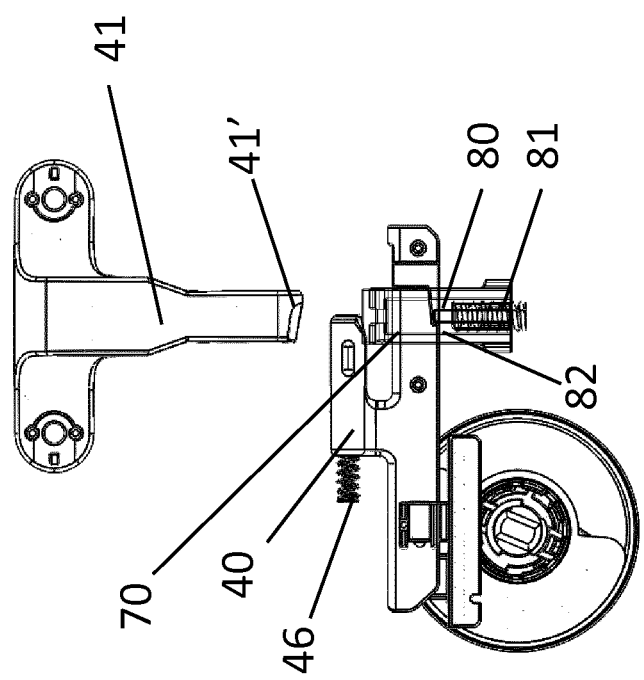
Figure 14G:
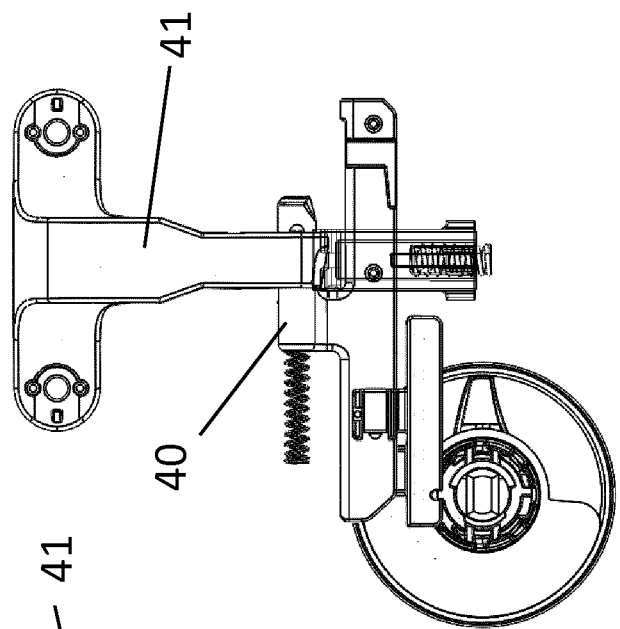
Figure 14H:
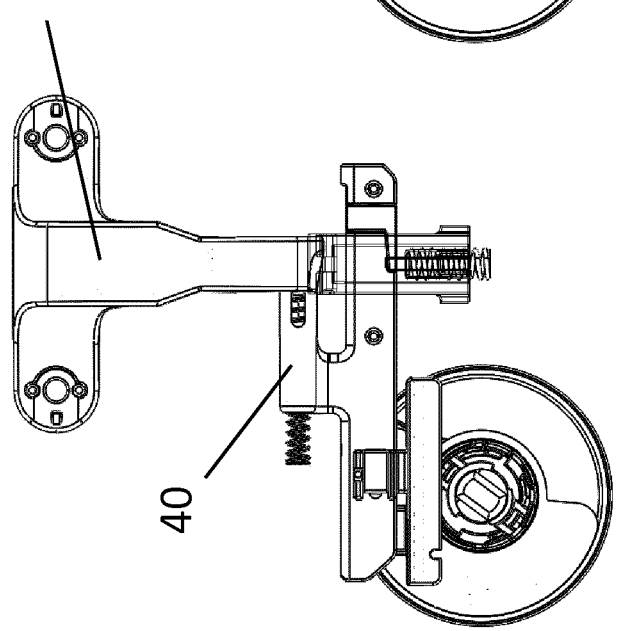
Figure 15E:
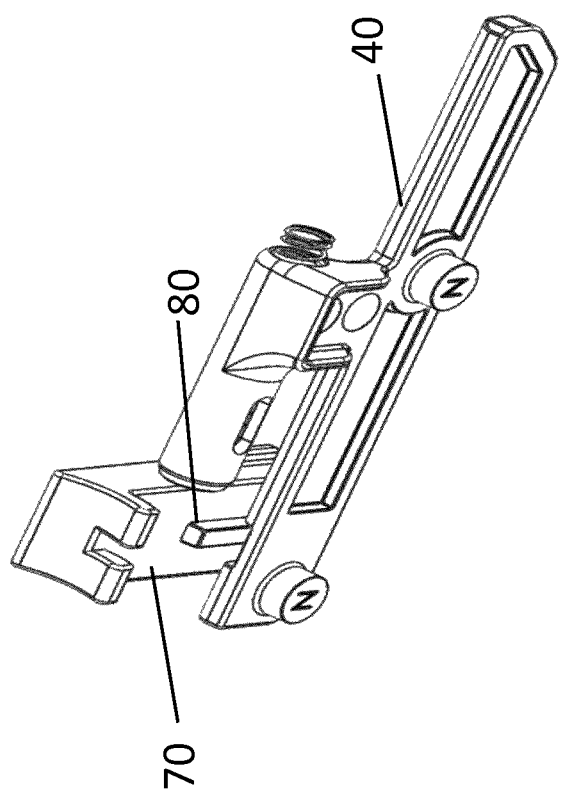

FIG. 14c shows a portion of the actuator 21, the lock element 40, the lock element blocking member 70, the lock member 41, the lock pin 80 and the spring 81. The biasing member 46 acting on the lock element 40 is also shown. Just as in FIGS. 14a-14b, the lock element blocking member 70 is illustrated slightly transparent to better show the stop pin 80 and its function. The stop pin 80 is also shown in FIG. 4. With reference to FIG. 14c, the lock element 40 comprises a stop surface 82 adapted to cooperate with the stop pin 80, and preferably as shown with the upper end of the stop pin 80. The stop pin 80 and the stop surface 82 of the lock element 40 prevent the lock element 40 from being displaced to an obstructing position, even if a user pushes down the lock element blocking member 70 with e.g. a finger. The lock element blocking member 70 and the stop pin 80 is displaced simultaneously and as the stop pin 80 is in a confined space as shown in e.g. FIG. 9, a user pushing down the lock element blocking member 70 by a finger cannot fully push down both the lock element blocking member 70 and the stop pin 80.

In FIG. 14d, the lock member 41 has been displaced vertically downwards as if the lid is closed. As can be noticed, an angled surface 41' on the tip of the lock member 41 is positioned adjacent the lock element 40. By the angled surface 41', the lock element 40 can be pushed back permitting the lock member 41 to be displaced further downwards in a vertical direction when viewed as shown in FIGS. 14d-14e. In the following FIGS. 14f-14g, the lock member 41 is pushed fully downwards so that the lock element 40 can be mated with the lock member 41 and the lid is retained from being opened.

In the shown manner, each lock site is provided with a protective safety function preventing the lock element 40 from obstructing the lock member 41. The function may be achieved by the angled surface 41' of the lock member 41 which can push the lock element 40 aside when it is being displaced downwards, but also by that the lock element 40 is prevented from being displaced to an obstructing position by the stop pin 80, i.e. by a portion of the lock element blocking member 70. It should be noted that the lock pin 80 and its function can be provided by a separate member with respect to the lock element blocking member 70, although it is preferred that the stop pin is formed by a portion of the lock element blocking member 70.

FIGS. 15a-15e show the lock element 40, lock element blocking member 70, the lid member 41 and the stop pin 80 from different views to illustrate their working cooperation.

It is an object of the present invention to provide a lock arrangement for a load carrier comprising a base and a lid to lock the lid to the base. The lock arrangement comprises at least a first displaceable lock element preferably at least a first and a second lock element, being operable between a locked position and an unlocked position. The first element is arranged to engage with a first lock member arranged on the opposing base or lid when being positioned in the locked position. The lock arrangement may further comprise at least one lock element blocking member. The lock element blocking member may when being in an extracted position temporarily block the first lock element from reaching a locked position, and/or it may operate as a push-up member for biasing the lock member and thus a lid connected thereto towards an opened position, the latter of the two mentioned functions may be its only function in an embodiment. The lock arrangement may further comprise a lock safety function to prevent the lock element from reaching an obstructing position. The lock arrangement may comprise a stop pin preferably biased by a spring or similar and cooperating with a stop surface on the lock element to prevent the lock element from reaching an obstructing position. The stop pin may be formed integrally with the lock element blocking member or as an individual component.

It should be noted that the features described herein can be combined in different ways even though not explicitly mentioned or described in combination. Likewise, combinations of features disclosed herein does not necessarily need to be combined together but could be used alone or in other combinations.

The invention claimed is:

1. A load carrier comprising:
   a base;
   a lid; and
   a lock arrangement arranged on said base or said lid, configured to lock said lid to said base, said lock arrangement comprising at least a first and a second displaceable lock element arranged at a distance from each other and being operable between a locked position and an unlocked position, said first and said second lock elements being arranged to respectively engage with a first and a second lock member arranged on the opposing base or lid when being positioned in said locked position, said lock arrangement further comprising an elongated actuation element in working cooperation with said first and said second lock elements, and an actuator arranged to displace said elongated actuation element from a locked position to a first position and thereby displacing said first and said second lock element from said locked position to said unlocked position, wherein said elongated actuation element is configured to be displaced by translation into its working cooperation with said first and said second lock elements,
   wherein said first lock element and said second lock elements are displaceably connected to said elongated actuation element so that they can be sequentially displaced from said unlocked position to said locked position.

2. The load carrier according to claim 1, wherein said first lock element can be displaced to engage with said first lock member, without the displacement of said elongated actuation element.

3. The load carrier according to claim 1, wherein said elongated actuation element is returned to a first intermediate position after simultaneously displacing said first and said second lock elements from a locked position to an unlocked position.

4. The load carrier according to claim 1, wherein said elongated actuation element and said second lock element can be simultaneously displaced to a locked position.

5. The load carrier according to claim 1, wherein said elongated actuation element can be displaced to a position, a first immobilizing position, in which said first and said second lock elements are prevented from displacement to said unlocked position.

6. The load carrier according to claim 1, wherein said first and second lock elements are individually biased towards respective locked position by a first and a second biasing member.

7. The load carrier according to claim 1, wherein said first and said second lock elements extend along a first center axis, said first center axis being parallel with said elongated actuation element.

8. The load carrier according to claim 1, wherein said first and said second lock elements are simultaneously displaced together with said elongated actuation element from a locked position to an unlocked position.

9. The load carrier according to claim 1, wherein said elongated actuation element is a rigid element.

10. The load carrier according to claim 1, wherein said first and said second lock elements are displaceably connected via a rotation or a translation connection to said elongated actuation element.

11. The load carrier according to claim 10, wherein said first and second lock elements are displaceably connected to said elongated actuation element via a guiding track and a protrusion, said guiding track permitting said protrusion to be displaced a limited distance with respect to said elongated actuation element.

12. The load carrier according to claim 1, wherein said locked position to which said first lock element and said second lock element can be sequentially displaced, is a preliminary lock position, wherein said first lock element and said second lock element subsequently can be positioned to a full lock position, either sequentially or simultaneously.

13. The load carrier according to claim 1, wherein at least said first lock element can be positioned in a preliminary lock position, wherein in said preliminary lock position, said first lock element is engaging the corresponding lock member, or wherein said first lock element subsequently can be positioned to a full lock position, in which the displacement of said first lock element is prevented by said elongated actuation element, or said lock arrangement further comprises at least one lock element blocking member, said lock element blocking member when being in an extracted position is arranged to temporarily block said first lock element from reaching said locked position.

14. The load carrier according to claim 1, wherein said actuator forms, or comprises, a displaceable indicator, said displaceable indicator being arranged to said elongated actuation element so that said displaceable indicator is displaced as a function of the displacement of said elongated actuation element.

15. The load carrier according to claim 1, wherein said first and said second lock elements are displaceable in a direction corresponding to, or substantially corresponding to, the direction of the elongation of the elongated actuation element.

16. The load carrier according to claim 1, wherein said actuator comprises a key to lock and unlock said actuator, wherein said key is only removable when all of said lock elements are in a locked position.

17. A method for locking and unlocking a load carrier comprising a lock arrangement according to claim 1, said method comprising:
   displacing said elongated actuation element using said actuator to unlock said first and said second lock elements;
   sequentially returning said lock elements to said lock position; and
   together with the last lock element, return said elongated actuation element to a locked position.

* * * * *